(12) United States Patent
Daimatsu et al.

(10) Patent No.: US 11,333,932 B2
(45) Date of Patent: *May 17, 2022

(54) OPTICAL FILM

(71) Applicant: SUMITOMO CHEMICAL COMPANY, LIMITED, Tokyo (JP)

(72) Inventors: Kazuki Daimatsu, Osaka (JP); Hitoshi Fukui, Osaka (JP); Masayoshi Karasawa, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,482

(22) Filed: Sep. 17, 2019

(65) Prior Publication Data

US 2020/0103712 A1  Apr. 2, 2020

(30) Foreign Application Priority Data

Sep. 28, 2018 (JP) .............................. JP2018-184773
May 16, 2019 (JP) .............................. JP2019-093077

(51) Int. Cl.
*G02F 1/1337* (2006.01)
*G02F 1/1335* (2006.01)
*G02F 1/1339* (2006.01)

(52) U.S. Cl.
CPC ...... *G02F 1/133723* (2013.01); *G02F 1/1339* (2013.01); *G02F 1/133528* (2013.01);
(Continued)

(58) Field of Classification Search
CPC ......... G02F 1/133723; G02F 1/133528; G02F 1/1339; C09K 2323/00; C09K 2323/025;
(Continued)

(56) References Cited

U.S. PATENT DOCUMENTS

2012/0229423 A1  9/2012  Takamiya et al.
2016/0215132 A1  7/2016  Zheng et al.
(Continued)

FOREIGN PATENT DOCUMENTS

JP          9-48866 A     2/1997
JP       2009-215412     9/2009
(Continued)

*Primary Examiner* — Ruiyun Zhang
(74) *Attorney, Agent, or Firm* — Birch, Stewart, Kolasch & Birch, LLP

(57) ABSTRACT

To provide an optical film having excellent visibility in a wide angle direction. An optical film including at least one resin selected from the group consisting of a polyimide-based resin and a polyamide-based resin and having a total light transmittance of 85% or more and a haze of 0.5% or less,
  wherein
  when a direction parallel to a machine direction in a plane of the optical film during production of the optical film is defined as an MD direction and a direction vertical to the machine direction is defined as a TD direction,
  a first transmission image clarity value $C_{60}(MD)$ in a direction inclined 60° in the MD direction from a vertical direction to the plane of the optical film, a second transmission image clarity value $C_{60}(TD)$ in a direction inclined 60° in the TD direction from the vertical direction, and a third transmission image clarity value $C_0$ of the vertical direction which are obtained when a width of an optical comb is 0.125 mm in accordance with JIS K 7374 satisfy Formulae, Formula (1):

$$87\% \leq C_{60}(MD) \leq 100\% \qquad (1),$$

(Continued)

Formula (2):

$$87\% \leq C_{60}(TD) \leq 100\%$$ (2), and

Formula (3):

$$0.8 \leq C_{60}(MD)/C_0 \leq 1.0$$ (3).

11 Claims, 2 Drawing Sheets

(52) U.S. Cl.
CPC .... *C09K 2323/00* (2020.08); *C09K 2323/025* (2020.08); *C09K 2323/03* (2020.08)

(58) Field of Classification Search
CPC .......... C09K 2323/027; C09K 2323/03; C09K 2323/06; G02B 1/14; C08G 73/1067; C08G 73/14; C08J 5/18; C08J 2379/08

USPC ................ 428/1.3, 1.25, 1.26, 1.6; 349/158; 524/600; 528/353

See application file for complete search history.

(56) References Cited

U.S. PATENT DOCUMENTS

| | | |
|---|---|---|
| 2017/0152358 A1 | 6/2017 | Koh et al. |
| 2017/0309867 A1 | 10/2017 | Mun et al. |
| 2017/0329062 A1* | 11/2017 | Nakajima .............. C08G 73/14 |
| 2018/0251398 A1 | 9/2018 | Ikegami et al. |
| 2018/0257335 A1 | 9/2018 | Matsuo et al. |
| 2018/0348411 A1 | 12/2018 | Yamaki et al. |
| 2018/0370207 A1* | 12/2018 | Nodono .............. H01L 51/0096 |
| 2019/0224942 A1 | 7/2019 | Matsuo et al. |
| 2020/0064540 A1 | 2/2020 | Nichol et al. |

FOREIGN PATENT DOCUMENTS

| | | | |
|---|---|---|---|
| JP | 2009-215412 A | 9/2009 | |
| JP | 2010-139379 A | 6/2010 | |
| JP | 2018-203986 A | 12/2018 | |
| WO | WO-2017014287 A1 * | 1/2017 | .............. C08J 7/043 |

* cited by examiner

OPTICAL FILM

BACKGROUND OF THE INVENTION

Field of the Invention

The present invention relates to an optical film including at least one resin selected from the group consisting of a polyimide-based resin and a polyamide-based resin, and a flexible display device including the optical film.

Description of the Related Art

Conventionally, glass has been used as a material of display members such as a solar cell or an image display device. However, the glass was not sufficient to meet the recent demands for miniaturization, thinness, weight reduction, and flexibility of the display members. Therefore, as an alternative material of glass, various films are being considered. Examples of such a film include a polyimide film (for example, JP-A-2009-215412).

SUMMARY OF THE INVENTION

When the polyimide film is applied to transparent members such as a front plate of a flexible display device, an image may be displayed with an image display surface being bent, and thus, excellent visibility in a wide angle direction is required as compared with a non-flexible image display surface. However, according to the study of the present inventor, the conventional polyimide-based resin film may not be able to sufficiently satisfy the visibility in the wide angle direction.

Therefore, an object of the present invention is to provide an optical film having excellent visibility in a wide angle direction, and a flexible display device including the optical film.

As a result of intensive studies for solving the above problems, the present inventors have found that the above problems can be solved by adjusting each of a transmission image clarity value $\{C_{60}(MD), C_{60}(TD)\}$ and a ratio $\{C_{60}(MD)/C_0\}$ of a transmission image clarity value to be within a predetermined range in an optical film which includes at least one resin selected from the group consisting of a polyimide-based resin and a polyamide-based resin and has a total light transmittance of 85% or more and a haze of 0.5% or less, and have completed the present invention. That is, the present invention includes the following aspects.

[1] An optical film including at least one resin selected from the group consisting of a polyimide-based resin and a polyamide-based resin and having a total light transmittance of 85% or more and a haze of 0.5% or less, wherein when a direction parallel to a machine direction in a plane of the optical film during production of the optical film is defined as an MD direction and a direction vertical to the machine direction is defined as a TD direction, a first transmission image clarity value $C_{60}(MD)$ in a direction inclined 60° in the MD direction from a vertical direction to the plane of the optical film, a second transmission image clarity value $C_{60}(TD)$ in a direction inclined 60° in the TD direction from the vertical direction, and a third transmission image clarity value $C_0$ of the vertical direction which are obtained when a width of an optical comb is 0.125 mm in accordance with JIS K 7374 satisfy Formula (1):

$$87\% \leq C_{60}(MD) \leq 100\% \quad (1),$$

Formula (2):

$$87\% \leq C_{60}(TD) \leq 100\% \quad (2), \text{ and}$$

Formula (3):

$$0.8 \leq C_{60}(MD)/C_0 \leq 1.0 \quad (3).$$

[2] The optical film according to [1], in which the second transmission image clarity value and the third transmission image clarity value further satisfy Formula (4):

$$0.9 \leq C_{60}(TD)/C_0 \leq 1.0 \quad (4).$$

[3] The optical film according to [1] or [2], wherein a ΔHaze, a difference in the hazes before and after a bending test in accordance with JIS K 5600-5-1, is less than 0.3%.

[4] The optical film according to any one of [1] to [3], wherein each of a $\Delta C_{60}(MD)$, a difference in the first transmission image clarity values before and after a bending test in accordance with JIS K 5600-5-1, a $\Delta C_{60}(TD)$, a difference in the second transmission image clarity values before and after the bending test, and a $\Delta C_0$, a difference in the third transmission image clarity values before and after the bending testis less than 15.

[5] The optical film according to any one of [1] to [4], wherein the optical film has a thickness of 10 to 150 μm.

[6] The optical film according to any one of [1] to [5], wherein a tensile modulus at 80° C. is 4,000 to 9,000 MPa.

[7] The optical film according to any one of [1] to [6], wherein the optical film has a hard coat layer on at least one surface thereof.

[8] The optical film according to [7], wherein the hard coat layer has a thickness of 3 to 30 μm.

[9] A flexible display device comprising the optical film according to any one of [1] to [8].

[10] The flexible display device according to [9], further comprising a touch sensor.

[11] The flexible display device according to [9] or [10], further comprising a polarizing plate.

According to the present invention, it is possible to provide an optical film having excellent visibility in a wide angle direction, and a flexible display device including the optical film.

DETAILED DESCRIPTION OF THE PREFERRED EMBODIMENTS

Figure 1:
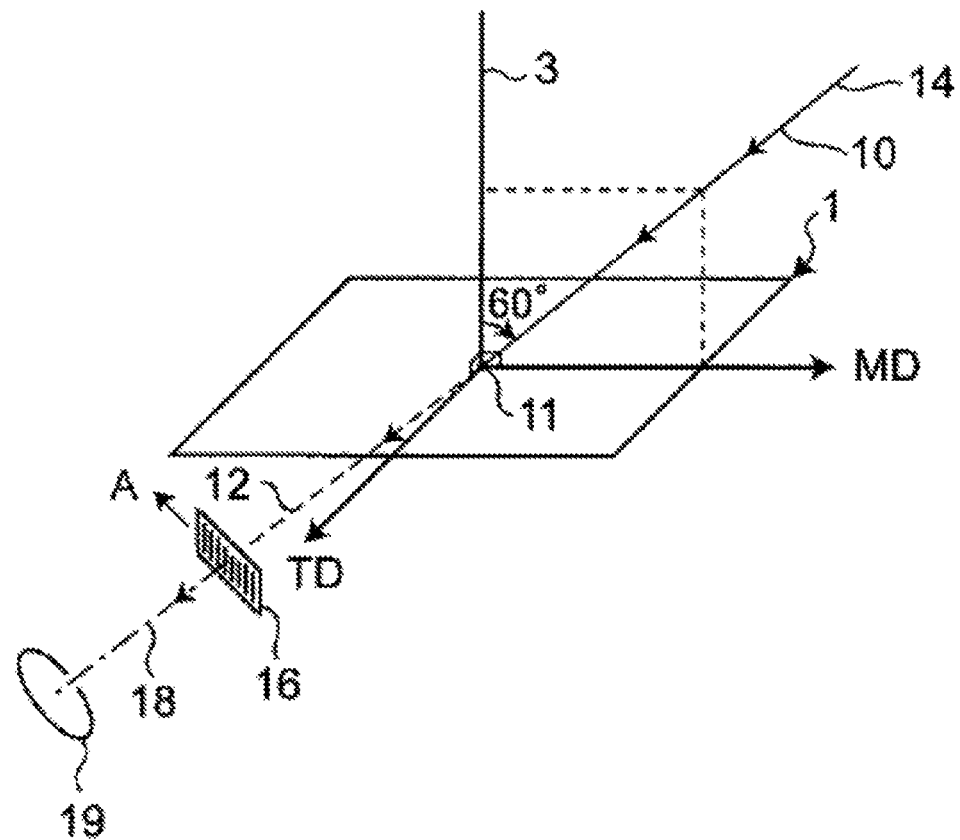
FIG. 1 is a diagram showing an optical axis on which a first transmission image clarity value is measured.

Embodiments of the present invention will be described below. The scope of the present invention is not limited to the embodiments described herein, and various modifications can be made without departing from the spirit of the present invention. In addition, when a plurality of upper limits and lower limits are described for specific parameters, optional upper limits and lower limits among these upper limits and lower limits are combined to form a suitable numerical range.

<Optical Film>

An optical film according to the present invention is an optical film which includes at least one resin selected from the group consisting of a polyimide-based resin and a polyamide-based resin and has a total light transmittance of 85% or more and a haze of 0.5% or less, in which when a direction parallel to a machine direction in a plane of the optical film during production of the optical film is defined as an MD direction and a direction vertical to the machine direction is defined as a TD direction, a first transmission image clarity value $C_{60}(MD)$ in a direction inclined 60° in the MD direction from a vertical direction to the plane of the optical film, a second transmission image clarity value $C_{60}(TD)$ in a direction inclined 60° in the TD direction from the vertical direction, and a third transmission image clarity value $C_0$ of the vertical direction which are obtained when a width of an optical comb is 0.125 mm in accordance with JIS K 7374 satisfy Formula (1):

$$87\% \leq C_{60}(MD) \leq 100\% \quad (1),$$

Formula (2):

$$87\% \leq C_{60}(TD) \leq 100\% \quad (2), \text{ and}$$

Formula (3):

$$0.8 \leq C_{60}(MD)/C_0 \leq 1.0 \quad (3).$$

[1. Formula (1)]

(MD Direction and TD Direction)

An MD direction is a direction parallel to a machine direction in a plane of the optical film during production of the optical film, and indicates, for example, a direction parallel to a direction in which the optical film is conveyed when produced by a solution casting method. A TD direction is a direction vertical to the machine direction, and indicates, for example, a direction vertical to the conveyed direction. When the MD direction and the TD direction are unknown, the MD direction and the TD direction in the plane of the optical film are determined by the following method. With regard to the MD and the TD, at least 20 cross sections are made in different directions of the optical film. More specifically, assuming a circle having an arbitrary one point of the optical film as a central point, the optical film is cut in a straight shape so that a central angle of a fan shape obtained by cutting a semicircle from the optical film and further cutting the semicircle becomes substantially uniform, and as a result, 20 or more cross sections are made. A center of a thickness of the plurality of cross sections obtained is measured by a laser Raman, and one having the largest peak intensity near 1,620 cm$^{-1}$ is defined as the MD direction.

(First Transmission Image Clarity Value $C_{60}(MD)$)

A first transmission image clarity value $C_{60}(MD)$ is a transmission image clarity value in a direction inclined 60° in an MD direction from a vertical direction to a plane of an optical film, which is obtained in accordance with Japanese Industrial Standard (JIS) K 7374. The first transmission image clarity value $C_{60}(MD)$ will be described more specifically with reference to FIG. 1. FIG. 1 is a diagram showing an optical axis on which the first transmission image clarity value is measured. A first incident light 10 (white light: indicated by a solid line in FIG. 1) is irradiated to an optical film 1 along an axis (first optical axis 14) inclined 60° in the MD direction from an axis (vertical axis 3) vertical to the optical film 1, with an arbitrary point (first incident position 11) on a surface of the optical film 1 as a fulcrum. Next, a 1a-th transmitted light 12 (indicated by a broken line in FIG. 1) transmitted through the optical film 1 is transmitted to a first optical comb 16 extending vertically to the first optical axis 14. Next, a 1b-th transmitted light 18 (indicated by an alternate long and short dash line in FIG. 1) transmitted through the first optical comb 16 is received by a first light receiver 19 extending vertically to the first optical axis 14. The first optical comb 16 has an opening which transmits the 1a-th transmitted light 12 and a light shielding unit which shields the 1a-th transmitted light 12. A slit width (width of the opening) of the first optical comb 16 is 0.125 mm.

The first light receiver 19 repeatedly receives the 1b-th transmitted light 18 by moving the first optical comb 16 in a predetermined unit width in a direction (direction of arrow A) which is parallel to a plane of the first optical comb 16 and in which slits are arranged in the first optical comb 16, thereby obtaining a received light waveform. A maximum value M and a minimum value m of a relative light amount are obtained from the light reception waveform obtained. The first transmission image clarity value $C_{60}(MD)$ is calculated based on Formula (5) from M and m obtained.

[Math. 1]

$$\text{Transmission image clarity value (transmission image sharpness)}[\%] = \frac{M-m}{M+m} \times 100 \quad (5)$$

The transmission image clarity values (the first transmission image clarity value, and the second transmission image clarity value and the third transmission image clarity value described later) can be measured using an image clarity meter.

When the first transmission image clarity value $C_{60}(MD)$ satisfies Formula (1), the optical film has excellent visibility in a wide angle direction in the MD direction. From the viewpoint of further improving visibility in the wide angle direction in the MD direction of the optical film, the first transmission image clarity value $C_{60}(MD)$ is 87% or more, preferably 89% or more, more preferably 90% or more, still more preferably 92% or more, and still more preferably 93% or more, but 100% or less, in Formula (1).

[2. Formula (2)]

(Second Transmission Image Clarity Value $C_{60}(TD)$)

Figure 2:
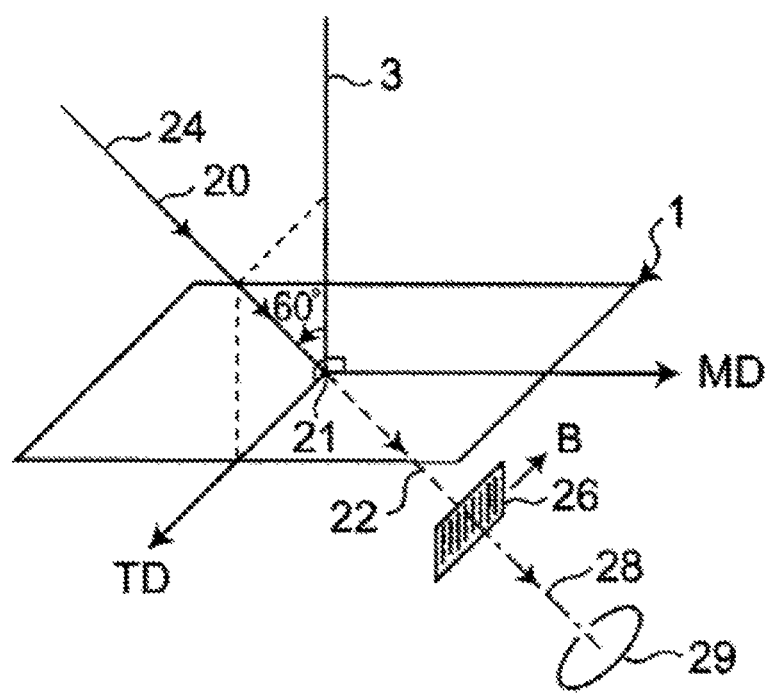
FIG. 2 is a diagram showing an optical axis on which a second transmission image clarity value is measured.

A second transmission image clarity value $C_{60}(TD)$ is a transmission image clarity value in a direction inclined 60° in a TD direction from a vertical direction to a plane of an optical film, which is obtained in accordance with JIS K 7374. The second transmission image clarity value $C_{60}(TD)$ will be described more specifically with reference to FIG. 2. FIG. 2 is a diagram showing an optical axis on which the second transmission image clarity value is measured. A second incident light 20 (white light: indicated by a solid line in FIG. 2) is irradiated to an optical film 1 along an axis (second optical axis 24) inclined 60° in the TD direction from an axis (vertical axis 3) vertical to the optical film 1, with an arbitrary point (second incident position 21) on a surface of the optical film 1 as a fulcrum. Next, a 2a-th transmitted light 22 (indicated by a broken line in FIG. 2)

transmitted through the optical film 1 is transmitted to a second optical comb 26 extending vertically to the second optical axis 24. Next, a 2b-th transmitted light 28 (indicated by an alternate long and short dash line in FIG. 2) transmitted through the second optical comb 26 is received by a second light receiver 29 extending vertically to the second optical axis 24. The second optical comb 26 has an opening which transmits the 2a-th transmitted light 22 and a light shielding unit which shields the 2a-th transmitted light 22. A slit width (width of the opening) of the second optical comb 26 is 0.125 mm.

The second light receiver 29 repeatedly receives the 2b-th transmitted light 28 by moving the second optical comb 26 in a predetermined unit width in a direction (direction of arrow B) which is parallel to a plane of the second optical comb 26 and in which slits are arranged in the second optical comb 26, thereby obtaining a received light waveform. A maximum value M and a minimum value m of a relative light amount are obtained from the light reception waveform obtained. The second transmission image clarity value $C_{60}$(TD) is calculated based on Formula (5) from the M and m obtained.

When the second transmission image clarity value $C_{60}$(TD) satisfies Formula (2), the optical film has excellent visibility in a wide angle direction in the TD direction. From the viewpoint of further improving visibility in the wide angle direction in the TD direction of the optical film, $C_{60}$(TD) is 87% or more, preferably 89% or more, more preferably 90% or more, still more preferably 92% or more, and still more preferably 93% or more, but 100% or less, in Formula (2).

[3. Formula (3)]
(Third Transmission Image Clarity Value $C_0$)

Figure 3:
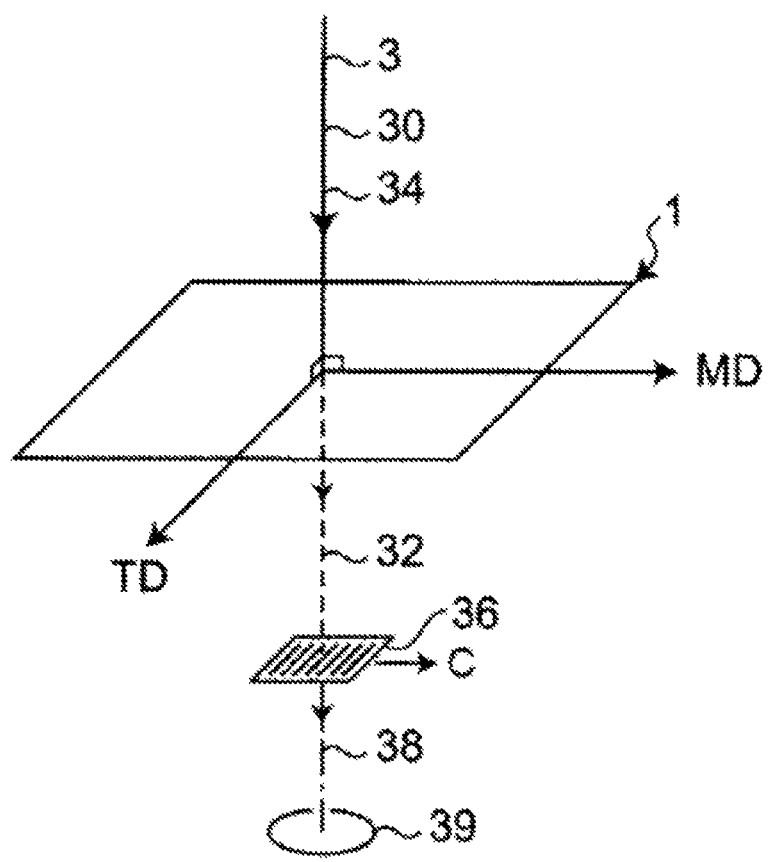
FIG. 3 is a diagram showing an optical axis on which a third transmission image clarity value is measured.

A third transmission image clarity value $C_0$ is a transmission image clarity value in a vertical direction to a plane of an optical film, which is obtained in accordance with JIS K 7374. The third transmission image clarity value $C_0$ will be described more specifically with reference to FIG. 3. FIG. 3 is a diagram showing an optical axis on which the third transmission image clarity value is measured. A third incident light 30 (white light: indicated by a solid line in FIG. 3) is irradiated to an arbitrary point (third incident position 31) on a surface of an optical film 1 along an axis (third optical axis 34) parallel to an axis (vertical axis 3) vertical to the optical film 1. Next, a 3a-th transmitted light 32 (indicated by a broken line in FIG. 3) transmitted through the optical film 1 is transmitted to a third optical comb 36 extending vertically to the third optical axis 34. Next, a 3b-th transmitted light 38 (indicated by an alternate long and short dash line in FIG. 3) transmitted through the third optical comb 36 is received by a third light receiver 39 extending vertically to the third optical axis 34. The third optical comb 36 has an opening which transmits the 3a-th transmitted light 32 and a light shielding unit which shields the 3a-th transmitted light 32. A slit width (width of the opening) of the third optical comb 36 is 0.125 mm.

The third light receiver 39 repeatedly receives the 3b-th transmitted light 38 by moving the third optical comb 36 in a predetermined unit width in a direction (direction of arrow C) which is parallel to a plane of the third optical comb 36 and in which slits are arranged in the third optical comb 36, thereby obtaining a received light waveform. A maximum value M and a minimum value m of a relative light amount are obtained from the light reception waveform obtained. The third transmission image clarity value $C_0$ is calculated based on Formula (5) from the M and m obtained.

When the first transmission image clarity value $C_{60}$(MD) and the third transmission image clarity value $C_0$ satisfy Formula (3), the optical film has excellent visibility in the MD direction with respect to a vertical direction of the optical film. From the viewpoint of further improving visibility in the MD direction, a ratio ($C_{60}$(MD)/$C_0$) of the first transmission image clarity value $C_{60}$(MD) to the third transmission image clarity value $C_0$ is 0.8 or more, preferably 0.90 or more, more preferably 0.93 or more, and still more preferably 0.94 or more, but 1.0 or less.

The third transmission image clarity value $C_0$ is preferably 97% or more, more preferably 98% or more, and still more preferably 99% or more, in Formula (3). The first transmission image clarity value $C_{60}$(MD) is preferably 89% or more, more preferably 90% or more, still more preferably 92% or more, and particularly preferably 93% or more, in Formula (3).

The transmission image clarity values (more specifically, the first transmission image clarity value $C_{60}$(MD), the second transmission image clarity value $C_{60}$(TD), and the third transmission image clarity value $C_0$) can be defined to smoothness of the surface of the optical film to suppress scattering and the like on the surface of the optical film, thereby adjusting the smoothness. Furthermore, the smoothness of the surface of the optical film can be adjusted, for example, by compositions (more specifically, a type of filler, a particle size, and a content, and the like) of the optical film, and production conditions (more specifically, drying temperature, drying time, an air flow in a drying system, a thickness of a coating film, a conveyance speed in a drying step, the amount of solvent in a varnish, and the like). When the optical film further includes a hard coat layer, smoothness of a surface of the hard coat layer can be improved to suppress scattering and the like on the surface of the hard coat layer, thereby adjusting the smoothness. The smoothness of the hard coat layer can be adjusted, for example, by adjustment of a type of solvent, a component ratio, adjustment of a solid content, addition of a leveling agent, and the like, in addition to the method of adjusting smoothness of an optical film.

[4. Formula (4)]

From the viewpoint of improving visibility in the TD direction with respect to the vertical direction of the optical film of the present invention, the second transmission image clarity value and the third transmission image clarity value further satisfy Formula (4):

$$0.9 \leq C_{60}(TD)/C_0 \leq 1.0 \quad (4).$$

From the viewpoint of further improving visibility in the TD direction in the present invention, a ratio ($C_{60}$(TD)/$C_0$) of the first transmission image clarity value to the third transmission image clarity value is preferably 0.9 or more, more preferably 0.91 or more, still more preferably 0.92 or more, particularly preferably 0.93 or more, and particularly preferably 0.94 or more, but 1.0 or less.

The second transmission image clarity value $C_{60}$(TD) is preferably 89% or more, more preferably 90% or more, still more preferably 92% or more, and particularly preferably 93% or more, in Formula (4). The third transmission image clarity value $C_0$ is preferably 97% or more, more preferably 98% or more, and still more preferably 99% or more, in Formula (4).

[5. Bending Resistance of Transmission Image Clarity Value]

In particular, when the optical film of the present invention is applied to a front plate of a flexible device, an absolute value $\Delta C_{60}$(MD) of a difference in the first transmission image clarity values, an absolute value $\Delta C_{60}$(TD) of a difference in the second transmission image clarity values, and an absolute value $\Delta C_0$ of a difference in the third transmission image clarity values before and after a bending test in accordance with JIS K 5600-5-1 each are preferably less than 15. If the difference in the transmission image clarity values before and after the bending test is less than 15, in particular, it is excellent in visibility in the wide angle direction even when the image display surface of the flexible device is used in a bent state and/or even after the image display surface is used in a bent state. The $\Delta C_{60}$(MD) is more preferably less than 1.5, still more preferably less than 1.0, and particularly preferably less than 0.5. The $\Delta C_{60}$(TD) is more preferably less than 2.8, still more preferably less than 2.3, particularly preferably less than 2.1, and highly particularly preferably less than 1.5. The $\Delta C_0$ is more preferably less than 2, still more preferably less than 1, particularly preferably less than 0.7, and highly particularly preferably less than 0.5.

[6. Total Light Transmittance]

The total light transmittance of the optical film of the present invention is 85% or more, preferably 87% or more, more preferably 89% or more, still more preferably 90% or more, particularly preferably 91% or more, particularly preferably 92% or more, and usually 100% or less, from the viewpoint of further improving visibility. The total light transmittance of the optical film can be measured in accordance with JIS K 7136-1:1997. The measurement method of the total light transmittance will be described in detail with reference to Examples.

[7. Haze and Difference in Haze]

The haze of the optical film of the present invention is 0.5% or less, preferably 0.4% or less, more preferably 0.3% or less, still more preferably 0.2% or less, from the viewpoint of further improving visibility.

In the optical film of the present invention, from the viewpoint of further improving the bending resistance of the haze, an absolute value ΔHaze of a difference in hazes before and after a bending test in accordance with JIS K 5600-5-1 is preferably less than 0.3%, more preferably less than 0.2%, and still more preferably less than 0.1%.

The haze of the optical film can be measured in accordance with JIS K 7136:2000. The measurement method of the haze and the calculation method of the difference in hazes will be described in detail in Examples.

[8. Yellow Index (YI)]

Yellow index (YI) of the optical film of the present invention is 4.0 or less, preferably 3.0 or less, more preferably 2.5 or less, still more preferably 2.0 or less, from the viewpoint of further improving visibility. The measurement method of the YI will be described in detail with reference to Examples.

[9. Number of Times of Bending]

The number of times of bending of the optical film of the present invention is preferably 20,000 times or more, more preferably 100,000 times or more, still more preferably 200,000 times or more, particularly preferably 350,000 times or more, and highly particularly preferably 700,000 times or more, from the viewpoint of improving folding resistance. If the number of times of bending is a lower limit or more, cracks, breakages or the like hardly occur even when the optical film is bent. In addition, the upper limit of the number of times of bending is usually 50,000,000 times or less. The number of times of bending of the optical film is measured by an MIT folding endurance fatigue test in accordance with ASTM standard D2176-16. The MIT folding endurance fatigue test is, for example, a test described in Examples.

[10. Thickness]

The thickness of the optical film of the present invention is preferably 10 μm or more, more preferably 20 μm or more, still more preferably 25 μm or more, and particularly preferably 30 μm or more, and preferably 150 μm or less, more preferably 100 μm or less, and still more preferably 85 μm or less. The measurement method of the thickness of the optical film will be described in detail with reference to Examples.

[11. Tensile modulus]

The tensile modulus at 80° C. of the optical film of the present invention is preferably 4,000 to 9,000 MPa, and more preferably 4,500 to 8,500 MPa. The measurement method of the tensile modulus will be described in detail with reference to Examples. When the tensile modulus is in the above range, dent defects hardly occur in the optical film. The tensile modulus of the optical film can be measured in accordance with JIS K 7127. The measurement method of the tensile modulus will be described in detail with reference to Examples.

[12. Hard Coat Layer]

The optical film of the present invention preferably has the hard coat layer on at least one surface thereof. When the hard coat layer is provided on both surfaces of the optical film, the two hard coat layers may contain the same or different components.

Examples of the hard coat layer include the well-known hard coat layers, such as an acrylic-based layer, an epoxy-based layer, a urethane-based layer, a benzyl chloride-based layer, and a vinyl-based layer. Among them, the hard coat layers of the acrylic-based layer, the urethane-based layer, and a combination thereof can be preferably used, from the viewpoint of suppressing the decrease in the visibility of the optical film in the wide angle direction and improving the bending resistance. The hard coat layer is formed by polymerizing and curing a curable compound by irradiation of active energy rays. Examples of the polymerizable compound include a polyfunctional (meth)acrylate-based compound. The polyfunctional (meth)acrylate-based compound is a compound having at least two (meth)acryloyloxy groups in a molecule thereof.

Examples of the polyfunctional (meth)acrylate-based compound include ethylene glycol di(meth)acrylate, diethylene glycol di(meth)acrylate, 1,6-hexanediol di(meth)acrylate, neopentyl glycol di(meth)acrylate, trimethylol propane tri(meth)acrylate, trimethylol ethane tri(meth)acrylate, tetramethylol methane tri(meth)acrylate, tetramethylol methane tetra(meth)acrylate, pentaglycerol tri(meth)acrylate, pentaerythritol tri(meth)acrylate, pentaerythritol tetra(meth)acrylate, glycerin tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tris((meth)acryloyloxyethyl)isocyanurate; a phosphazene-based (meth)acrylate compound having a (meth)acryloyloxy group introduced into the phosphazene ring of the phosphazene compound; a urethane (meth)acrylate compound obtained by reaction of polyisocyanate having at least two isocyanate groups in the molecule with a polyol compound having at least one (meth)acryloyloxy group and hydroxyl group in the molecule; a polyester (meth)acrylate compound obtained by reaction of a polyol compound having at least two carboxylic acid halide and at least one (meth)acryloyloxy group and hydroxyl group in the molecule; oligomers such as a dimer and a trimer of each of the compounds, and the like. These compounds may each be used alone or in combination of two or more.

The curable compound may contain monofunctional (meth)acrylate-based compounds in addition to the polyfunctional (meth)acrylate-based compounds. Examples of the monofunctional (meth)acrylate-based compounds include hydroxyethyl (meth)acrylate, 2-hydroxyethyl (meth) acrylate, 2-hydroxypropyl (meth)acrylate, hydroxybutyl (meth)acrylate, 2-hydroxy-3-phenoxypropyl (meth)acrylate, glycidyl (meth)acrylate and the like. These compounds may be used alone or in combination of two or more. The content of the monofunctional (meth)acrylate-based compound is preferably 10% by mass or less when the solid content of the compound contained in the curable composition is 100% by mass. Note that in this specification, the solid content means all the components except the solvent contained in the curable composition.

The curable composition which forms the hard coat layer may contain additives, in addition to the polyfunctional (meth)acrylate-based compound and a polymerizable oligomer. Examples of the additives include a polymerization initiator, silica, a leveling agent, a solvent and the like. Examples of the solvent include methyl ethyl ketone, polypropylene glycol monomethyl ether, and the like.

In addition, the curable compound may also contain the polymerizable oligomer. A hardness of the hard coat layer can be adjusted by containing the polymerizable oligomer. Examples of the polymerizable oligomers can include a macromonomer such as terminal (meth)acrylate polymethyl methacrylate, terminal styryl poly (meth)acrylate, terminal (meth)acrylate polystyrene, terminal (meth)acrylate polyethylene glycol, a terminal (meth)acrylate acrylonitrile-styrene copolymer, and a terminal (meth)acrylate styrene-methyl (meth)acrylate copolymer. The content of the polymerizable oligomer is preferably 5 to 50% by mass when the solid content of the compound contained in the curable composition is 100% by mass.

The thickness of the hard coat layer is preferably 3 to 30 μm, more preferably 5 to 25 μm, and still more preferably 5 to 20 μm from the viewpoint of improving the hardness of the optical film.

[13. Protective Film]

In one embodiment of the present invention, the optical film may have a protective film on at least one surface (one surface or both surfaces). For example, when a functional layer is provided on one surface of the optical film, the protective film may be laminated on the surface on the optical film or the surface on the functional layer, and laminated on both surfaces of the optical film and the functional layer. When the functional layers are provided on both surfaces of the optical film, the protective film may be laminated on the surface on one functional layer, or may be laminated on the surfaces on both functional layers. The protective film is a film for temporarily protecting the surface of the optical film or the functional layer, and is not particularly limited as long as it is a peelable film capable of protecting the surface of the optical film or the functional layer. Examples of the protective film include polyester-based resin films such as polyethylene terephthalate, polybutylene terephthalate, and polyethylene naphthalate, polyolefin-based resin films such as polyethylene and polypropylene films, acrylic-based resin films and the like, and is preferably selected from the group consisting of the polyolefin-based resin films, the polyethylene terephthalate-based resin films, and the acrylic-based resin films. When the optical film has two protective films, each protective film may be the same or different.

The thickness of the protective film is not particularly limited, but is usually 10 to 120 μm, preferably 10 to 110 μm, and more preferably 15 to 100 μm. When the optical film has two protective films, the thickness of each protective film may be the same or different.

[14. Polyimide, Polyamide-based Resin]

The optical film of the present invention contains at least one resin selected from the group consisting of a polyimide-based resin and a polyamide-based resin. The polyimide-based resin is a resin (hereinafter, sometimes referred to as polyimide resin) containing a repeating structural unit containing an imide group, and indicates at least one resin selected from the group consisting of a resin (hereinafter, sometimes referred to as a polyamideimide resin) containing a repeating structural unit containing both the imide group and an amide group. In addition, the polyamide-based resin shows a resin (hereinafter, sometimes referred to as a polyamide-based resin hereafter) containing the repeating structural unit containing the amide group.

The polyimide-based resin preferably has a repeating structural unit represented by Formula (10). Here, G is a tetravalent organic group, and A is a divalent organic group. The polyimide-based resin may contain two or more types of repeating structural units represented by Formula (10) in which G and/or A is different.

[Chem. 1]

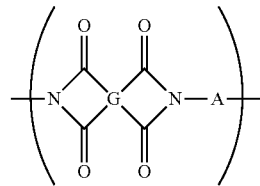

(10)

The polyimide-based resin includes at least one repeating structural unit selected from the group consisting of repeating structural units represented by Formula (11), Formula (12), and Formula (13), in a range in which various physical properties of the optical film are not impaired.

[Chem. 2]

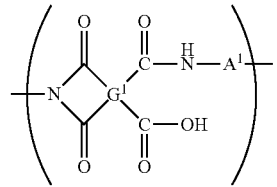

(11)

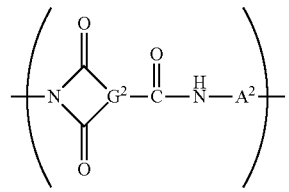

(12)

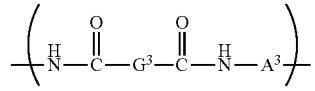

(13)

In Formulae (10) and (11), G and G' each independently represent a tetravalent organic group and preferably an organic group which may be substituted into a hydrocarbon group or a fluorine-substituted hydrocarbon group. As G and G', groups represented by Formula (20), Formula (21), Formula (22), Formula (23), Formula (24), Formula (25), Formula (26), Formula (27), Formula (28), or Formula (29) and a tetravalent chain hydrocarbon group having 6 or less carbon atoms are exemplified. Among them, since the yellow index (YI value) of the optical film tends to be suppressed, among them, the groups represented by Formula (20), Formula (21), Formula (22), Formula (23), Formula (24), Formula (25), Formula (26), or Formula (27) are preferable.

[Chem. 3]

(20)

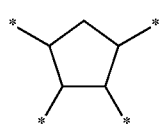
(21)

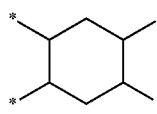
(22)

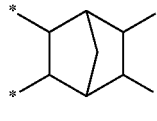
(23)

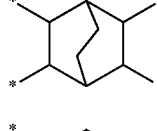
(24)

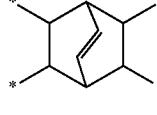
(25)

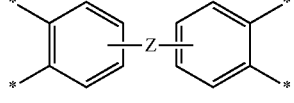
(26)

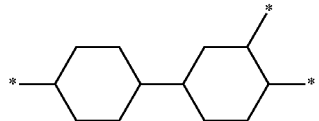
(27)

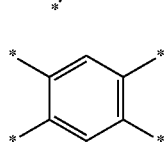
(28)

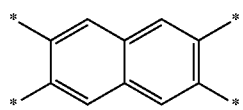
(29)

In formulas (20) to (29),
* represents a bond,
Z represents a single bond, —O—, —CH$_2$—, —CH$_2$—CH$_2$—, —CH(CH$_3$)—, —C(CH$_3$)$_2$—, —C(CF$_3$)$_2$—, —Ar—, —SO$_2$—, —CO—, —O—Ar—O—, —Ar—O—Ar—, —Ar—CH$_2$—Ar—, —Ar—C(CH$_3$)$_2$—Ar— or —Ar—SO$_2$—Ar—. Ar represents an arylene group which may be substituted into a fluorine atom and has 6 to 20 carbon atoms, and a specific example thereof includes a phenylene group.

In Formula (12), G$^2$ is a trivalent organic group, preferably an organic group which may be substituted into a hydrocarbon group or a fluorine-substituted hydrocarbon group. As G$^2$, a group in which any one of bonds of groups represented by Formula (20), Formula (21), Formula (22), Formula (23), Formula (24), Formula (25), Formula (26), Formula (27), Formula (28), or Formula (29) is substituted into a hydrogen atom and a trivalent chain hydrocarbon group having 6 or less carbon atoms are exemplified.

In Formula (13), G$^3$ is a divalent organic group, and preferably an organic group which may be substituted into a hydrocarbon group or a fluorine-substituted hydrocarbon group. As G$^3$, a group in which, of bonds of groups represented by Formula (20), Formula (21), Formula (22), Formula (23), Formula (24), Formula (25), Formula (26), Formula (27), Formula (28), or Formula (29), two bonds which are not adjacent to each other are substituted into a hydrogen atom and a chain hydrocarbon group having 6 or less carbon atoms are exemplified.

In Formulae (10) to (13), A, A$^1$, A$^2$, and A$^3$ each independently represent a divalent organic group and preferably an organic group which may be substituted into a hydrocarbon group or a fluorine-substituted hydrocarbon group. As A, A$^1$, A$^2$, and A$^3$, a group represented by Formula (30), Formula (31), Formula (32), Formula (33), Formula (34), Formula (35), Formula (36), Formula (37), or Formula (38); a group substituted into a methyl group, a fluoro group, a chloro group, or a trifluoromethyl group; and a chain hydrocarbon group having 6 or less carbon atoms are exemplified.

[Chem. 4]

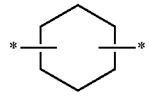
(30)

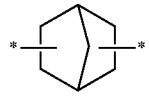
(31)

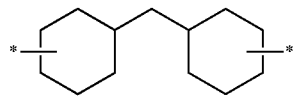
(32)

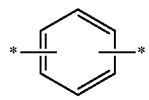
(33)

-continued

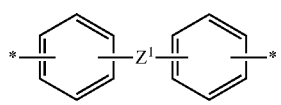
(34)

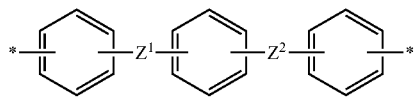
(35)

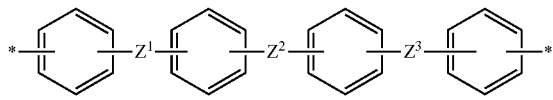
(36)

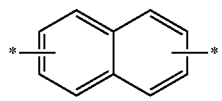
(37)

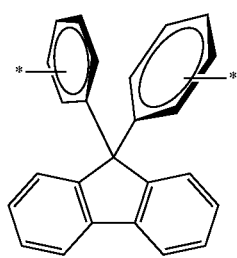
(38)

In formulae (30) to (38),
* represents a bond,
$Z^1$, $Z^2$, and $Z^3$ each independently represent a single bond, —O—, —CH$_2$—, —CH$_2$—CH$_2$—, —CH(CH$_3$)—, —C(CH$_3$)$_2$—, —C(CF$_3$)$_2$—, —SO$_2$—, or —CO—.

One example is that $Z^1$ and $Z^3$ are —O—, and $Z^2$ is —CH$_2$—, —C(CH$_3$)$_2$—, —C(CF$_3$)$_2$—, or —SO$_2$—. Bonding positions of each of $Z^1$ and $Z^2$ to each ring and bonding positions of each of $Z^2$ and $Z^3$ to each ring are preferably a meta- or para-position to each ring.

The polyimide-based resin is preferably a polyamideimide resin having at least repeating structural unit represented by Formula (10) and the repeating structural unit represented by Formula (13) from the viewpoint of easily improving the visibility. In addition, the polyamide-based resin preferably has at least the repeating structural unit represented by Formula (13).

In one embodiment of the present invention, the polyimide-based resin is a condensation type polymer obtained by reacting (polycondensating) a diamine and a tetracarboxylic acid compound (acid chloride compound, tetracarboxylic acid compound analogues such as tetracarboxylic acid dianhydride), and, if necessary, a dicarboxylic acid compound (dicarboxylic acid compound analogues such as an acid chloride compound), a tricarboxylic acid compound (acid chloride compound, tricarboxylic acid compound analogues such as a tricarboxylic acid anhydride) and the like. The repeating structural unit represented by Formula (10) or Formula (11) is usually derived from the diamine and the tetracarboxylic acid compound. The repeating structural unit represented by Formula (12) is usually derived from the diamine and the tricarboxylic acid compound. The repeating structural unit represented by Formula (13) is usually derived from the diamine and the dicarboxylic acid compound.

In one embodiment of the present invention, the polyamide-based resin is the condensation type polymer obtained by reacting (polycondensating) the diamine and the dicarboxylic acid compound. That is, the repeating structural unit represented by Formula (13) is usually derived from the diamine and the dicarboxylic acid compound.

Examples of the tetracarboxylic acid compound include aromatic tetracarboxylic acid compounds such as an aromatic tetracarboxylic acid dianhydride; aliphatic tetracarboxylic acid compounds such as an aliphatic tetracarboxylic acid dianhydride, and the like. The tetracarboxylic acid compound may be used alone or in combination of two or more. The tetracarboxylic acid compound may be tetracarboxylic acid compound analogues such as an acid chloride compound other than a dianhydride.

Specific examples of the aromatic tetracarboxylic acid dianhydride include 4,4'-oxydiphthalic acid dianhydride, 3,3',4,4'-benzophenonetetracarboxylic acid dianhydride, 2,2',3,3'-benzophenonetetracarboxylic acid dianhydride, 3,3',4,4'-biphenyltetracarboxylic acid dianhydride, 2,2',3,3'-biphenyltetracarboxylic acid dianhydride, 3,3',4,4'-diphenylsulfonetetracarboxylic acid dianhydride, 2,2-bis(3,4-dicarboxyphenyl)propane dianhydride, 2,2-bis(2,3-dicarboxyphenyl)propane dianhydride, 2,2-bis(3,4-dicarboxyphenoxyphenyl)propane dianhydride, 4,4'-(hexafluoroisopropylidene)diphthalic dianhydride (6FDA), 1,2-bis(2,3-dicarboxyphenyl)ethane dianhydride, 1,1-bis(2,3-dicarboxyphenyl)ethane dianhydride, 1,2-bis(3,4-dicarboxyphenyl)ethane dianhydride, 1,1-bis(3,4-dicarboxyphenyl)ethane dianhydride, bis(3,4-dicarboxyphenyl)methane dianhydride, bis(2,3-dicarboxyphenyl)methane dianhydride, 4,4'-(p-phenylenedioxy)diphthalic acid dianhydride, and 4,4'-(m-phenylenedioxy)diphthalic acid dianhydride. These can be used alone or in combination of two or more.

The aliphatic tetracarboxylic acid dianhydride includes cyclic or non-cyclic aliphatic tetracarboxylic acid dianhydrides. The cycloaliphatic tetracarboxylic acid dianhydride is a tetracarboxylic acid dianhydride having an alicyclic hydrocarbon structure, and specific examples thereof include cycloalkanetetracarboxylic acid dianhydrides such as 1,2,4,5-cyclohexanetetracarboxylic acid dianhydride, 1,2,3,4-cyclobutanetetracarboxylic acid dianhydride, and 1,2,3,4-cyclopentanetetracarboxylic acid dianhydride, bicyclo[2.2.2]oct-7-ene-2,3,5,6-tetracarboxylic acid dianhydride, dicyclohexyl-3,3',4,4'-tetracarboxylic acid dianhydride, and a regioisomer thereof. These can be used alone or in combination of two or more. Specific examples of the acyclic aliphatic tetracarboxylic acid dianhydrides include 1,2,3,4-butanetetracarboxylic acid dianhydride, 1,2,3,4-pentanetetracarboxylic acid dianhydride and the like, and these can be used alone or in combination of two or more. In addition, the cycloaliphatic tetracarboxylic acid dianhydride and the acyclic aliphatic tetracarboxylic acid dianhydride may be used in combination.

Among the tetracarboxylic acid dianhydrides, from the viewpoint of high transparency and low colorability, 1,2,4,5-cyclohexanetetracarboxylic acid dianhydride, bicyclo[2.2.2]oct-7-ene-2,3,5,6-tetracarboxylic acid dianhydride, and 4,4'-(hexafluoroisopropylidene)diphthalic acid dianhydride, and mixtures thereof are preferable. In addition, as the tetracarboxylic acid, a water adduct of an anhydride of the tetracarboxylic acid compound may be used.

Examples of the tricarboxylic acid compounds include aromatic tricarboxylic acid, aliphatic tricarboxylic acid, and acid chloride compounds of analogues thereof, acid anhydrides and the like, and two or more thereof may be used in combination.

Specific examples thereof include anhydrides of 1,2,4-benzenetricarboxylic acid; 2,3,6-naphthalenetricarboxylic acid-2,3-anhydride; and a compound in which phthalic anhydride and benzoic acid are linked by a single bond, —$CH_2$—, —$C(CH_3)_2$—, —$C(CF_3)_2$—, —$SO_2$—, or a phenylene group.

Examples of the tricarboxylic acid compounds include aromatic dicarboxylic acid, aliphatic dicarboxylic acid, and acid chloride compounds of analogues thereof, acid anhydrides and the like, and two or more thereof may be used in combination. Specific examples thereof include terephthalic acid dichloride (terephthaloyl chloride (TPC)); isophthalic acid dichloride; naphthalenedicarboxylic acid dichloride; 4,4'-biphenyldicarboxylic acid dichloride; 3,3'-biphenyldicarboxylic acid dichloride; 4,4'-oxybis(benzoyl chloride) (OBBC); and a dicarboxylic acid compound of a chain hydrocarbon having 8 or less carbon atoms and a compound in which two benzoic acids are linked by a single bond, —$CH_2$—, —$C(CH_3)_2$—, —$C(CF_3)_2$—, —$SO_2$—, or a phenylene group.

Examples of the diamine include an aliphatic diamine, an aromatic diamine, or a mixture thereof. In the present embodiment, the "aromatic diamine" refers to a diamine in which an amino group is directly bonded to an aromatic ring, and a part of the structure thereof may contain an aliphatic group or other substituents. The aromatic ring may be a single ring or a condensed ring, and examples thereof include a benzene ring, a naphthalene ring, an anthracene ring, and a fluorene ring, but are not limited thereto. Among them, the aromatic ring is preferably a benzene ring. In addition, the "aliphatic diamine" refers to a diamine in which an amino group is directly bonded to an aliphatic group, and a part of the structure thereof may contain an aromatic ring or other substituents.

Examples of the aliphatic diamine include acyclic aliphatic diamines such as hexamethylene diamine, cycloaliphatic diamines such as 1,3-bis(aminomethyl)cyclohexane, 1,4-bis(aminomethyl)cyclohexane, norbornane diamine, 4,4'-diaminodicyclohexylmethane and the like. These can be used alone or in combination of two or more.

Examples of the aromatic diamine include aromatic diamines having one aromatic ring such as p-phenylenediamine, m-phenylenediamine, 2,4-toluenediamine, m-xylylenediamine, p-xylylenediamine, 1,5-diaminonaphthalene, and 2,6-diaminonaphthalene; and aromatic diamines having two or more aromatic rings such as 4,4'-diaminodiphenylmethane, 4,4'-diaminodiphenylpropane, 4,4'-diaminodiphenylether, 3,4'-diaminodiphenylether, 3,3'-diaminodiphenylether, 4,4'-diaminodiphenyl sulfone, 3,4'-diaminodiphenyl sulfone, 3,3'-diaminodiphenyl sulfone, 1,4-bis(4-aminophenoxy)benzene, 1,3-bis(4-aminophenoxy)benzene, 4,4'-diaminodiphenyl sulfone, bis[4-(4-aminophenoxy)phenyl]sulfone, bis[4-(3-aminophenoxy) phenyl]sulfone, 2,2-bis[4-(4-aminophenoxy)phenyl]propane, 2,2-bis[4-(3-aminophenoxy)phenyl]propane, 2,2'-dimethylbenzidine, 2,2'-bis(trifluoromethyl)benzidine(2,2'-bis(trifluoromethyl)-4,4'-diaminodiphenyl (TFMB)), 4,4'-bis(4-aminophenoxy)biphenyl, 9,9-bis(4-aminophenyl)fluorene, 9,9-bis(4-amino-3-methylphenyl)fluorene, 9,9-bis(4-amino-3-chlorophenyl)fluorene, and 9,9-bis(4-amino-3-fluorophenyl)fluorene. These can be used alone or in combination of two or more.

Among the above diamines, from the viewpoint of high transparency and low colorability, it is preferable to use one or more selected from the group consisting of aromatic diamines having a biphenyl structure, it is more preferable to use one or more selected from the group consisting of 2,2'-dimethylbenzidine, 2,2'-bis(trifluoromethyl)benzidine, 4,4'-bis(4-aminophenoxy)biphenyl, and 4,4'-diaminodiphenylether, and it is still more preferable to use 2,2'-bis (trifluoromethyl)benzidine.

The polyimide-based resin is obtained by mixing the respective raw materials such as the diamine, the tetracarboxylic acid compound, the tricarboxylic acid compound, and the dicarboxylic acid compound according to the conventional method, for example, the methods such as stirring and then imidizing the resulting intermediate under the presence of an imidized catalyst and a dehydrating agent as needed. The polyamide-based resin can be obtained by mixing the respective raw materials such as the diamine and the dicarboxylic acid compound according to the conventional method, for example, the methods such as stirring.

The imidized catalyst used in a imidizing step is not particularly limited, and examples thereof include aliphatic amines such as tripropylamine, dibutylpropylamine and ethyldibutylamine; alicyclic amines (monocyclic) such as N-ethylpiperidine, N-propylpiperidine, N-butylpyrrolidine, N-butylpiperidine, and N-propylhexahydroazepine; alicyclic amines (polycyclic) such as azabicyclo[2.2.1]heptane, azabicyclo[3.2.1]octane, azabicyclo[2.2.2]octane, and azabicyclo[3.2.2]nonane; and aromatic amines such as 2-methylpyridine, 3-methylpyridine, 4-methylpyridine, 2-ethylpyridine, 3-ethylpyridine, 4-ethylpyridine, 2,4-dimethylpyridine, 2,4,6-trimethylpyridine, 3,4-cyclopentenopyridine, 5,6,7,8-tetrahydroisoquinoline and isoquinoline.

The dehydrating agent used in the imidizing step is not particularly limited, but examples thereof include an acetic anhydride, a propionic acid anhydride, an isobutyric acid anhydride, a pivalic acid anhydride, a butyric acid anhydride, an isovaleric acid anhydride and the like.

The reaction temperature in the mixing and imidizing steps of the respective raw materials is not particularly limited, but is, for example, 15 to 350° C. and preferably 20 to 100° C. The reaction time is also not particularly limited, but is, for example, about 10 minutes to 10 hours. If necessary, the reaction may be performed under conditions of inert atmosphere or reduced pressure. In addition, the reaction may be performed in a solvent, and examples of the solvent include those exemplified as the solvent used for the preparation of the varnish. After the reaction, the polyimide-based resin or the polyamide-based resin is purified. Examples of the purification method include a method of adding a poor solvent to a reaction solution to deposit a resin by a reprecipitation, drying the deposited resin, taking out precipitates, and if necessary, washing the precipitates with a solvent such as methanol and drying the precipitates.

Note that for the production of the polyimide-based resin, reference may be made to, for example, the production method described in JP-A-2006-199945 or JP-A-2008-163107. In addition, as the polyimide-based resin, commercially available products can also be used, and a specific example of the polyimide-based resin item include neoprim (registered trademark) manufactured by MITSUBISHI GAS CHEMICAL COMPANY, INC., KPI-MX300F manufactured Kawamura Sangyo Co., Ltd., and the like.

A weight average molecular weight of the polyimide-based resin or the polyamide-based resin is preferably 200,000 or more, more preferably 250,000 or more, and still more preferably 300,000 or more, but preferably 600,000 or less, more preferably 550,000 or less, and still more preferably 500,000 or less. The larger the weight average molecular weight of the polyimide-based resin or the polyamide-based resin, the easier the expression of the high bending resistance at the time of film formation. Therefore, from the viewpoint of enhancing the bending resistance of the optical film, it is preferable that the weight average molecular weight is the lower limit or higher. On the other hand, as the weight average molecular weight of the polyimide-based resin or the polyamide-based resin is reduced, the viscosity of the varnish tends to be low and processability tends to be improved. In addition, stretchability of the polyimide-based resin or polyamide-based resin tends to be improved. Therefore, from the viewpoint of the processability and the stretchability, it is preferable that the weight average molecular weight is the upper limit or lower. Note that in the present application, the weight average molecular weight can be measured by gel permeation chromatography (GPC) and determined by standard polystyrene conversion, and can be calculated, for example, by the method described in Examples.

The imidization ratio of the polyimide-based resin in the optical film is preferably 95 to 100%, more preferably 97 to 100%, still more preferably 98 to 100%, and particularly preferably 100%. From the viewpoint of the stability of the varnish and the mechanical properties of the obtained optical film, it is preferable that the imidization ratio is the lower limit or higher. Note that the imidization rate can be determined by an IR method, an NMR method or the like. From the above viewpoint, the imidization rate of the polyimide-based resin contained in the varnish is preferably in the above range.

In a preferred embodiment of the present invention, the polyimide-based resin or the polyamide-based resin contained in the optical film of the present invention may contain a halogen atom such as a fluorine atom which can be introduced, for example, by the fluorine-containing substituent and the like. When the polyimide-based resin or the polyamide-based resin contains a halogen atom, it is easy to improve the modulus of elasticity of the optical film and reduce the yellow index (YI value). When the modulus of elasticity of the optical film is high, the occurrence of flaws and wrinkles and the like in the film is easily suppressed, and when the yellow index of the optical film is low, the transparency of the film is easily improved. The halogen atom is preferably a fluorine atom. Preferred examples of the fluorine-containing substituent in order to make the polyimide-based resin or the polyamide-based resin contain the fluorine atom include a fluoro group and a trifluoromethyl group.

The content of the halogen atom in the polyimide-based resin or the polyamide-based resin is preferably 1 to 40% by mass, more preferably 5 to 40% by mass, and still more preferably 5 to 30% by mass, based on the mass of the polyimide-based resin or the polyamide-based resin. When the content of the halogen atom is 1% by mass or more, the modulus of elasticity when forming a film is more improved, a water absorption is lowered, the yellow index (YI value) is more reduced, and the transparency is more easily improved. When the content of the halogen atom exceeds 40% by mass, synthesis may be difficult in some cases.

In one embodiment of the present invention, the content of the polyimide-based resin and/or the polyamide-based resin in the optical film is preferably 40% by mass or more, more preferably 50% by mass or more, and still more preferably 70% by mass or more based on the total mass of the optical film. It is preferable that the content of the polyimide-based resin and/or the polyamide-based resin is the lower limit or higher from the viewpoint of easily improving the bending resistance and the like. Note that the content of the polyimide-based resin and/or the polyamide-based resin in the optical film is usually 100% by mass or less based on the total mass of the optical film.

The optical film of the present invention preferably contains two or more resins selected from the group consisting of the polyimide-based resins and the polyamide-based resins. When the optical film contains the two or more resins, in other words, for example, when the varnish contains the two or more resins in the method for producing an optical film described later, the viscosity of the varnish can be easily adjusted to an appropriate range. In particular, it becomes easy to apply a varnish to a substrate in an application step of the production method to form a uniform coating film. As a result, the produced optical film can be easily adjusted to the range of Formulae (1) to (3). In such a case, the visibility of the optical film in the wide angle direction is further improved.

Examples of the two or more resins include two or more polyimide-based resins, two or more polyamide-based resins, and a combination of one or more polyimide-based resins and one or more polyamide-based resins.

In particular, among the two or more resins, the two or more resins are preferably two or more polyimide-based resins or two or more polyamide-based resins having weight average molecular weights different from each other. Among the two or more polyimide-based resins or the two or more polyamide-based resins, the weight average molecular weight of at least one polyimide-based resin or at least one polyamide-based resin may be 250,000 to 500,000, and the weight average molecular weight of another at least one polyimide-based resin or another at least one polyamide-based resin may be 200,000 to 450,000.

In particular, among the two or more resins, the two or more resins are more preferably two polyimide-based resins or two polyamide-based resins having weight average molecular weights different from each other. Among the two polyimide-based resins or the two polyamide-based resins, the weight average molecular weight of one polyimide-based resin or one polyamide-based resin may be 250,000 to 500,000, and the weight average molecular weight of the other polyimide-based resin or the other polyamide-based resin may be 200,000 to 450,000.

When the optical film contains the two polyimide-based resins or the two polyamide-based resins, a weight ratio (former/latter) of the weight ratio of one polyimide-based resin or one polyamide-based resin and the other polyimide-based resin or the other polyamide-based resin can be appropriately selected according to the type of resins and the desired solid content concentration of the varnish, which may be, for example, 5/95 to 95/5.

[15. Additive]

The optical film of the present invention may further contain additives. Examples of such an additive include a filler (more specifically, a silica particle and the like), an ultraviolet absorbent, a brightener, a silica dispersant, an antioxidant, a pH adjusting agent, and a leveling agent.

(Silica Particle)

The optical film of the present invention may further contain silica particles. A content of the silica particles is preferably 1% by mass or more, more preferably 3% by mass or more, and still more preferably 5% by mass or more based on the total mass of the optical film. In addition, the content of the silica particles is preferably 60% by mass or less, more preferably 50% by mass or less, and still more preferably 45% by mass or less based on the total mass of the optical film. In addition, the content of the silica particles can be combined by selecting an arbitrary lower limit value and an upper limit value of these upper limit values and lower limit values. When the content of the silica particles is in a numerical value range of the upper limit value and/or the lower limit value, in the optical film of the present invention, since the silica particles are unlikely to be aggregated and tend to be uniformly dispersed in a primary particle state, a decrease in visibility of the optical film of the present invention can be suppressed.

An average particle diameter of the silica particles is preferably 1 nm or more, more preferably 3 nm or more, still more preferably 5 nm or more, and particularly preferably 8 nm or more, but preferably 30 nm or less, more preferably 28 nm or less, and still more preferably 25 nm or less. When the content of the silica particles is in a numerical value range of the upper limit value and/or the lower limit value, in the optical film of the present invention, since white light is difficult to interact with light of a specific wavelength, a decrease in visibility of the optical film of the present invention can be suppressed. In the present specification, the particle diameter of the silica particle represents an average primary particle diameter. The particle diameter of the silica particle in the optical film can be measured by imaging with a transmission electron microscope (TEM). The particle diameter of the silica particle before the optical film is produced (for example, before added to a varnish) can be measured by a laser diffraction particle size analyzer. The measurement method of the particle diameter of the optical film will be described in detail with reference to Examples.

Examples of a form of the silica particle include a silica sol in which silica particles are dispersed in an organic solvent and the like and silica powder prepared by a vapor phase method. Among them, silica so is preferable from the viewpoint of workability.

The silica particle may be subjected to surface treatment, and may be, for example, a silica particle subjected to solvent substitution with a water-soluble alcohol-dispersed silica sol (more specifically, γ-butyrolactone and the like). The water-soluble alcohol is an alcohol having 3 or less carbon atoms per one hydroxyl group in one molecule of the water-soluble alcohol, and examples thereof include methanol, ethanol, 1-propanol, 2-propanol, and the like. Although the compatibility between the silica particle and the polyimide-based resin and the polyamide-based resin depends on the type thereof, typically, when the silica particle is subjected to surface treatment, the compatibility with the polyimide-based resin and the polyamide-based resin which are included in the optical film is improved, and dispersibility of the silica particle tends to be improved, resulting in suppression of a decrease in visibility of the present invention.

(Ultraviolet Absorbent)

The optical film of the present invention may further contain ultraviolet absorbents. For example, examples of the ultraviolet absorbent include a triazine-based ultraviolet absorbent, a benzophenone-based ultraviolet absorbent, a benzotriazole ultraviolet absorbent, a cyanoacrylate ultraviolet absorbent, and the like. These may be used alone or in combination of two or more. Examples of the appropriate ultraviolet absorbent commercially available include Sumibarb (registered trademark) 340 manufactured by Sumika Chemtex Co., Ltd., Adekastab (registered trademark) LA-31 manufactured by ADEKA Co., Ltd., and Tinuvin (registered trademark) 1577 manufactured by BASF Japan Co. Ltd, and the like. A content of the ultraviolet absorbent is preferably 1 phr or more and 10 phr or less, and more preferably 3 phr or more and 6 phr or less, based on the mass of the optical film of the present invention.

(Brightener)

The optical film of the present invention may further contain a brightener (hereinafter, abbreviated as BA). For example, in a case where additives other than a brightener are added, the brightener can be added for adjusting a hue. Examples of the brightener include a monoazo dye, a triarylmethane dye, a phthalocyanine dye, an anthraquinone dye, and the like. Of these, the anthraquinone dye is preferred. Examples of the appropriate brightener commercially available include Macrolex (registered trademark) Violet B manufactured by LANXESS K.K., Sumiplast (registered trademark) Violet B manufactured by Sumika Chemtex Co., Ltd., Diaresin (registered trademark) blue G manufactured by Mitsubishi Chemical Corporation, and the like. These may be used alone or in combination of two or more. A content of the brightener is preferably 5 ppm or more and 40 ppm or less, based on the mass of the optical film of the present invention.

The applications of the optical film of the present invention are not particularly limited, and the optical film may be used for various applications. The optical film of the present invention may be a single layer or a laminate as described above, and the optical film of the present invention may be used as it is, and furthermore, may be used as a laminate with another film. Since the optical film of the present invention has excellent surface quality, the optical film is useful as an optical film in an image display device or the like. Note that when the optical film is a laminate, the optical film is referred to as an optical film including all layers laminated on one surface or both surfaces of the optical film.

The applications of the optical film of the present invention are not particularly limited, and the optical film may be used for various applications. Since the optical film of the present invention has excellent visibility in a wide angle direction, the optical film is useful as an optical film in an image display device or the like. In particular, the optical film of the present invention is useful as a front plate of an image display device, in particular, a front plate (window film) of a flexible display. The flexible display has, for example, a flexible functional layer, and the optical film which is superimposed on the flexible functional layer and functions as the front plate. That is, the front plate of the flexible display is disposed on a viewing side on the flexible functional layer. This front plate has a function of protecting the flexible functional layer.

[16. Production Method of Optical Film]

The optical film of the present invention is not particularly limited, but can be produced by a method including, for example, the following steps:

(a) preparing a liquid (hereinafter sometimes referred to as a varnish) containing the resin and the filler (varnish preparation step), (b) applying the varnish to a substrate to form a coating film (application step), and (c) drying the applied liquid (coating film) to form an optical film (optical film forming step).

In the varnish preparation step, the resin is dissolved in a solvent, and the filler and, if necessary, other additives are added and stirred and mixed to prepare the varnish. Note that, in a case where silica is used as a filler, a silica sol may be added to a resin, the silica sol being obtained by substituting a silica sol dispersant containing silica by a solvent in which the resin is soluble, such as a solvent used in preparation of the following varnish.

The solvent used for the preparation of the varnish is not particularly limited as long as the resin can be dissolved. Examples of the solvents include amide-based solvents such as N,N-dimethylacetamide (DMAc), N,N-dimethylformamide; lactone-based solvents such as γ-butyrolactone (GBL) and γ-valerolactone; sulfur-containing solvents such as dimethyl sulfone, dimethyl sulfoxide, and sulfolane; carbonate-based solvents such as ethylene carbonate and propylene carbonate; and combinations thereof. Among them, the amide-based solvents or the lactone-based solvents are preferable. These solvents may be used alone or in combination of two or more. In addition, the varnish may also contain water, an alcohol-based solvent, a ketone-based solvent, an acyclic ester-based solvent, an ether-based solvent and the like. The solid content concentration of the varnish is preferably 1 to 25% by mass and more preferably 5 to 20% by mass.

In the application step, the varnish is applied to the substrate by the known application method to form a coating film. Examples of the known application methods include a wire bar coating method, a roll coating method such as reverse coating and gravure coating, a die coating method, a comma coating method, a lip coating method, a screen coating method, a fountain coating method, and a flow forming method and the like.

In the optical film formation step, the optical film is formed by drying the coating film (referred to as first drying), and further peeling the coating film from the substrate and then drying the dried coating film (referred to as second drying or post-baking treatment). The first drying may be carried out under the conditions of inert atmosphere or reduced pressure, as necessary. The first drying is preferably performed at a relatively low temperature over time. When the first drying is performed at a relatively low temperature over time, the reflection image clarity value of the produced optical film tends to satisfy the above Formulae (1) to (3).

Here, when the optical film of the present invention is industrially produced, the actual production environment may be often disadvantageous in enhancing the visibility in the wide angle direction as compared with the production environment at a laboratory level, and as a result, it is difficult to improve the visibility of the optical film in the wide angle direction. As described above, the fact that it is preferable to perform the first drying at the relatively low temperature over time is as described above, but at the laboratory level, when the first drying is performed, since the drying can be performed in a closed drier, the surface of the optical film is relatively less likely to be roughened due to external factors. On the other hand, when the optical film is industrially produced, for example, since it is necessary to heat a large area in the first drying, an air blower may be used at the time of heating. As a result, the surface state of the optical film tends to be roughened, and it is difficult to improve the visibility of the optical film in the wide angle direction.

In the case of performing drying by heating, particularly considering external factors as described above when the optical film is industrially produced, the first drying temperature is preferably 60 to 150° C., more preferably 60 to 140° C., and still more preferably 70 to 140° C. The first drying time is preferably 1 to 60 minutes and more preferably 5 to 40 minutes. In particular, considering the external factors as described above when the optical film is industrially produced, it is preferable to perform the first drying under the drying temperature conditions of three or more stages. The drying can be performed at the same or different temperature conditions and/or drying time in each stage under the multi-stage condition, and the drying may be performed in, for example, 3 to 10 stages and preferably 3 to 8 stages. When the first drying is performed in three or more stages of multi-stage condition the reflection image clarity value of the produced optical film tends to satisfy Formulae (1) to (3), and the visibility in the wide angle direction is improved. In a mode under the multi-stage condition of three or more stages, it is preferable that a temperature profile of the first drying includes temperature rising and temperature falling. That is, it is preferable that the first drying conditions in the optical film forming step are three or more stages of heating temperature conditions in which the temperature profile includes temperature rising and temperature falling. Describing the case of a fourth stage as such a temperature profile as an example, the first drying temperature is 70 to 90° C. (first temperature), 90 to 120° C. (second temperature), 80 to 120° C. (third temperature), and 80 to 100° C. (fourth temperature) in order. In this example, the first drying temperature rises from a first temperature to a second temperature, and then falls from the second temperature to a third temperature, and further falls from the third temperature to a fourth temperature. Here, the first drying time is, for example, 5 to 15 minutes in each stage. The first drying is preferably performed so that the residual amount of solvent of the dried coating film is preferably 5 to 15% by mass, more preferably 6 to 12% by mass relative to the mass of the dried coating film. When the residual amount of solvent is in the above range, the peelability of the dried coating film from the substrate becomes good, and the reflection image clarity value of the produced optical film tends to satisfy Formulae (1) to (3).

The second drying temperature is preferably 150 to 300° C., more preferably 180 to 250° C., and still more preferably 180 to 230° C. The second drying time is preferably 10 to 60 minutes and more preferably 30 to 50 minutes.

The second drying may be performed in a single wafer manner, but in the case of industrial production, the second drying may be performed by a roll-to-roll method from the viewpoint of production efficiency. In the single wafer type, it is preferable to perform the drying in a state of being uniformly stretched in an in-plane direction. In the roll-to-roll manner, it is preferable to dry the dried coating film in the stretched state in the conveyance direction from the viewpoint of easily satisfying the range of the above Formulae (1) to (3), and the transport speed is preferably 0.1 to 5 m/min, more preferably 0.5 to 3 m/min, and still more preferably 0.7 to 1.5 m/min. The second drying may be performed in one stage or multi-stage conditions. The drying can be preferably performed in at least one selected from the same or different temperature conditions, drying time, and a wind speed of hot air in each stage under the multi-stage conditions and may be performed in, for example, 3 to 10 stages and preferably 3 to 8 stages, and it is preferable to perform the drying in the multi-stage conditions from the viewpoint that the optical film tends to satisfy the range of Formulae (1) to (3). In addition, in each stage, the wind speed of the hot air is preferably 5 to 20 m/min, more preferably 10 to 15 m/min, and still more preferably 11 to 14 m/min, from the viewpoint that the reflection image clarity value of the produced optical film tends to satisfy Formulae (1) to (3).

When the optical film of the present invention is provided with the hard coat layer, the hard coat layer can be formed, for example, by applying a curable composition on at least one surface of the optical film to form a coating film, irradiating high energy ray to the coating film, and curing the coating film.

Examples of the substrate include a SUS plate if the substrate is a metal-based substrate, and a PET film, a PEN film, another polyimide-based resin or a polyamide-based resin film, a cycloolefin-based polymer (COP) film, acrylic-based film and the like if the substrate is a resin-based substrate. Among them, the PET film, the COP film and the like are preferable from the viewpoint of excellent smoothness and heat resistance, and furthermore, the PET film is more preferable from the viewpoint of adhesion to the optical film and cost.

When the optical film of the present invention includes the hard coat layer, the hard coat layer is formed, for example, using the composition for forming the hard coat layer. The composition for forming the hard coat layer contains, for example, a monomer and/or an oligomer, a photoinitiator, silica, a leveling agent, and a solvent. Examples of the monomer include a polyfunctional monomer (more specifically, a bifunctional monomer, a trifunctional monomer and the like). Examples of the oligomers include decafunctional urethane oligomers. Examples of the solvent include methyl ethyl ketone, polypropylene glycol monomethyl ether and the like.

In the step of forming the hard coat layer, the hard coat layer is formed by irradiating the high energy ray to the coating film and curing the coating film. The irradiation intensity is appropriately determined by the composition of the curable composition and is not particularly limited, but it is preferable to perform irradiation in a wavelength range in which an activation of a polymerization initiator is effective. The irradiation intensity is preferably 0.1 to 6,000 $mW/cm^2$, more preferably 10 to 1,000 $mW/cm^2$, and still more preferably 20 to 500 $mW/cm^2$. If the irradiation intensity is in the above range, an appropriate reaction time can be secured, and yellowing or deterioration of a resin due to heat radiated from the light source and heat generated at the time of the curing reaction can be suppressed. The irradiation time may be appropriately selected according to the composition of the curable composition and is not particularly limited, but an accumulated amount of light represented as the product of the irradiation intensity and the irradiation time is set to be preferably 10 to 10,000 $mJ/cm^2$, more preferably 50 to 1,000 $mJ/cm^2$, and still more preferably 80 to 500 $mJ/cm^2$. If the accumulated amount of light is in the above range, a sufficient amount of active species derived from the polymerization initiator can be generated to allow the curing reaction to proceed more reliably, and furthermore, the irradiation time does not become too long and good productivity can be achieved. In addition, it is useful because the hardness of the hard coat layer can be further increased by passing through the irradiation step in this range. From the viewpoint of improving the smoothness of the hard coat layer and further improving the visibility of the optical film in the wide angle direction, there is a need to optimize the type of solvent, the component ratio, and the solid content concentration and add the leveling agent and the like.

<Flexible Image Display Device>

The present invention includes a flexible display device including the optical film. The optical film of the present invention is preferably used as the front plate in the flexible image display device, and the front plate is referred to as a window film. The flexible image display device includes a laminate for a flexible image display device and an organic EL display panel, and the laminate for a flexible image display device is disposed on a viewing side of an organic EL display panel and is configured to be foldable. The laminate for the flexible image display device may further include a polarizing plate and a touch sensor, and a lamination order thereof is optional, but it is preferable that the window film, the polarizing plate, the touch sensor or window film, the touch sensor, and the polarizing plate are laminated in this order from a viewing side. If the polarizing plate is present on the viewing side of the touch sensor, a pattern of the touch sensor is less likely to be recognized visually, and the visibility of the displayed image is improved, which is preferable. Each member can be laminated using an adhesive, a pressure-sensitive adhesive or the like. In addition, the light shielding pattern may be provided on at least one surface of any layer of the window film, the polarizing plate, and the touch sensor.

[Polarizing Plate]

As described above, the flexible display device of the present invention includes a polarizing plate and preferably a circular polarizing plate. The circular polarizing plate is a functional layer having a function of transmitting only the right or left circularly polarized light component by laminating a $\lambda/4$ retardation plate on a linear polarizing plate. For example, the circular polarizing plate converts external light into right circularly polarized light and reflects the external light from the organic EL panel to shield left circularly polarized external light, and transmits only a luminescence component of the organic EL to suppress the influence of the reflected light, thereby making an image easy to see. In order to achieve the circular polarization function, an absorption axis of the linear polarizing plate and a slow axis of the $\lambda/4$ retardation plate theoretically need to be 45°, but practically 45±10°. The linear polarizing plate and the $\lambda/4$ retardation plate do not necessarily have to be laminated adjacent to each other as long as the relationship between the absorption axis and the slow axis satisfies the above-mentioned range. It is preferable to achieve complete circular polarization in the entire wavelength, but the circular polarizing plate in the present invention also includes an elliptically polarizing plate because it is not always necessary in practice. It is also preferable to improve the visibility in a state where polarized sunglasses are worn by further laminating the $\lambda/4$ retardation film on the viewing side of the linear polarizing plate and converting the emitted light into the circularly polarized light.

The linear polarizing plate is a functional layer which transmits light vibrating in a transmission axis direction but shields polarized light having a vibrational component vertical thereto. The linear polarizing plate may be configured to include a linear polarizer alone or a protective film attached to the linear polarizer and at least one surface thereof. The thickness of the linear polarizing plate may be 200 μm or less, and preferably 0.5 to 100 μm. If the thickness of the linear polarizing plate is in the above range, the flexibility of the linear polarizing plate is less likely to be reduced.

The linear polarizer may be a film type polarizer produced by dyeing and stretching a polyvinyl alcohol (hereinafter, sometimes abbreviated as PVA)-based film. A dichroic pigment such as iodine is adsorbed into a PVA-based film aligned by stretching, or stretched with being adsorbed to PVA, such that the dichroic pigment is aligned and exhibits polarization performance. The production of the film type polarizer may include other steps such as swelling, crosslinking with boric acid, washing with an aqueous solution, and drying. The stretching or dyeing steps may be performed with the PVA-based film alone, or may be performed in a state where the PVA-based film is laminated with another film such as polyethylene terephthalate. The thickness of the PVA-based film to be used is preferably 10 to 100 μm, and the stretching ratio is preferably 2 to 10 times.

In addition, another example of the polarizer includes a liquid crystal application type polarizer which is formed by applying a liquid crystal polarizing composition. The liquid crystalline polarizing composition can include a liquid crystalline compound and a dichroic pigment compound. The liquid crystalline compound only needs to have the property of exhibiting a liquid crystal state, and is preferable because it can exhibit high polarization performance particularly when it has a high-order alignment state such as a smectic phase. In addition, the liquid crystalline compound preferably has a polymerizable functional group.

The dichroic pigment compound is a pigment which exhibits dichroism by being aligned with the liquid crystal compound, and may have a polymerizable functional group, and the dichroic pigment itself may have liquid crystallinity.

Any of the compounds contained in the liquid crystal polarizing composition has the polymerizable functional group. The liquid crystal polarizing composition may further contain an initiator, a solvent, a dispersant, a leveling agent, a stabilizer, a surfactant, a crosslinking agent, a silane coupling agent, and the like.

A liquid crystal polarizing layer is produced by applying the liquid crystal polarizing composition on an alignment film to form the liquid crystal polarizing layer. The liquid crystal polarizing layer can be formed thinner than a film type polarizer, and the thickness thereof is preferably 0.5 to 10 μm and more preferably 1 to 5 μm.

The alignment film is produced, for example, by applying an alignment film forming composition on a substrate and imparting alignment by rubbing, irradiation with polarized light and the like. The alignment film forming composition may contain an aligning agent, and may further contain a solvent, a crosslinking agent, an initiator, a dispersant, a leveling agent, a silane coupling agent, and the like. Examples of the aligning agent include polyvinyl alcohols, polyacrylates, polyamic acids, and polyimides. In the case of using the aligning agent which imparts alignment by the polarized light irradiation, it is preferable to use an aligning agent containing a cinnamate group. The weight average molecular weight of the polymer used as the aligning agent is, for example, about 10,000 to 1,000,000. The thickness of the alignment film is preferably 5 to 10,000 nm, and more preferably 10 to 500 nm in that an alignment control force is sufficiently exhibited.

The liquid crystal polarizing layer can be peeled off from the substrate, transferred and laminated, or the substrate can be laminated as it is. It is also preferable that the substrate plays a role as a protective film, a retardation plate, and a transparent substrate of a window film.

As the protective film, a transparent polymer film may be used, and the same materials and additives as those used for the transparent substrate of the window film can be used. In addition, the protective film may be a coating type protective film obtained by applying and curing a cationic curing composition such as an epoxy resin or a radical curing composition such as acrylate. If necessary, the protective film may include a plasticizer, an ultraviolet absorbent, an infrared absorber, a colorant such as a pigment or a dye, a fluorescent brightener, a dispersant, a heat stabilizer, a light stabilizer, an antistatic agent, an antioxidant, a lubricant, a solvent and the like. The thickness of the protective film is preferably 200 μm or less and more preferably 1 to 100 μm. If the thickness of the protective film is in the above range, the flexibility of the film is less likely to be reduced.

The Δ/4 retardation plate is a film which gives a retardation of Δ/4 in a direction (in-plane direction of the film) orthogonal to a traveling direction of incident light. The Δ/4 retardation plate may be a stretching type retardation plate produced by stretching a polymer film such as a cellulose-based film, an olefin-based film, or a polycarbonate-based film. If necessary, the Δ/4 retardation plate may include a phase difference conditioner, a plasticizer, an ultraviolet absorbent, an infrared absorber, a colorant such as a pigment or a dye, a fluorescent brightener, a dispersant, a heat stabilizer, a light stabilizer, an antistatic agent, an antioxidant, a lubricant, a solvent and the like.

The thickness of the stretching type retardation plate is preferably 200 μm or less and more preferably 1 to 100 μm. If the thickness of the stretching type retardation plate is in the above range, the flexibility of the stretching type retardation plate is less likely to be reduced.

In addition, another example of the Δ/4 retardation plate includes a liquid crystal application type retardation plate which is formed by applying a liquid crystal composition.

The liquid crystal composition contains a liquid crystal compound exhibiting a liquid crystal state such as nematic, cholesteric, and smectic. The liquid crystal compound has a polymerizable functional group.

The liquid crystal composition may further contain an initiator, a solvent, a dispersant, a leveling agent, a stabilizer, a surfactant, a crosslinking agent, a silane coupling agent, and the like.

Similar to the liquid crystal polarizing layer, the liquid crystal application type retardation plate can be produced by applying and curing a liquid crystal composition on a base to form a liquid crystal retardation layer. The liquid crystal application type retardation plate can be formed thinner than the stretching type retardation plate. The thickness of the liquid crystal polarizing layer is preferably 0.5 to 10 μm and more preferably 1 to 5 μm.

The liquid crystal application type retardation plate can be peeled off from the substrate, transferred and laminated, or the substrate can be laminated as it is. It is also preferable that the substrate plays a role as a protective film, a retardation plate, and a transparent substrate of a window film.

In general, there are many materials that exhibit greater birefringence at shorter wavelengths and smaller birefringence at longer wavelengths. In this case, since it is not possible to achieve a phase difference of Δ/4 in the entire visible light region, the in-plane phase difference is designed to be preferably 100 to 180 nm and more preferably 130 to 150 nm so that it is Δ/4 in the vicinity of 560 nm at which visibility is high. An inverse dispersion Δ/4 retardation plate using a material having birefringence wavelength dispersion characteristics opposite to normal characteristics is preferable in that the visibility is good. As such a material, for example, the stretching type retardation plate can use those described in JP-A-2007-232873 and the like and liquid crystal application type retardation plate can use those described in JP-A-2010-30979 and the like.

In addition, as another method, there is also known a technology of obtaining a wide band Δ/4 retardation plate by combining with a Δ/2 retardation plate (for example, JP-A-10-90521 and the like). The Δ/2 retardation plate is also produced by the same material and method as the Δ/4 retardation plate. Although the combination of the stretching type retardation plate and the liquid crystal application type retardation plate is optional, both the stretched retardation plate and the liquid crystal application type retardation plate can use the liquid crystal application type retardation plate to have a thin thickness.

There is known a method of laminating a positive C plate on a circular polarizing plate in order to enhance visibility in an oblique direction (for example, JP-A-2014-224837). The positive C plate may be a liquid crystal application type retardation plate or a stretching type retardation plate. The retardation in the thickness direction of the retardation plate is preferably −200 to −20 nm and more preferably −140 to −40 nm.

[Touch Sensor]

As described above, the flexible display device of the present invention includes a touch sensor. The touch sensor is used as an input unit. Examples of the touch sensor includes various types such as a resistive film type, a surface acoustic wave type, an infrared type, an electromagnetic induction type, and a capacitance type, and preferably, the touch sensor uses the capacitance type.

The capacitance type touch sensor is divided into an active area and a non-active area located at an outer portion of the active area. The active area which is an area corresponding to an area (display portion) in which a screen is displayed on a display panel is an area in which a user's touch is sensed, and the non-active area is an area corresponding to an area (non-display portion) in which the screen is not displayed on the display device. The touch sensor can include a substrate having flexible characteristics, a sensing pattern formed on an active area of the substrate, and each sensing line which is formed in a non-active area of the substrate and connected to external driving circuits via the sensing pattern and a pad portion. As a substrate having a flexible property, the same material as the transparent substrate of the window film can be used.

The sensing pattern may include a first pattern formed in a first direction and a second pattern formed in a second direction. The first pattern and the second pattern are arranged in different directions from each other. The first pattern and the second pattern are formed on the same layer, and in order to sense the touched point, the respective patterns need to be electrically connected to each other. The first pattern has a form in which a plurality of unit patterns are connected to each other through a joint, but the second pattern has a structure in which a plurality of unit patterns are separated from each other in an island form, and therefore a separate bridge electrode is required to make the electrical connection of the second pattern. A well-known transparent electrode can be applied to the electrode for connection of the second pattern. Examples of materials for the transparent electrode include indium tin oxide (ITO), indium zinc oxide (IZO), zinc oxide (ZnO), indium zinc tin oxide (IZTO), indium gallium zinc oxide (IGZO), cadmium tin oxide (CTO), poly(3,4-ethylenedioxythiophene) (PEDOT), carbon nanotubes (CNT), graphene, metal wires and the like, and preferably, the ITO is used. These can be used alone or in combination of two or more. The metal used for the metal wire is not particularly limited, and examples thereof include silver, gold, aluminum, copper, iron, nickel, titanium, selenium, chromium, and the like, and these metals may be used alone or in combination of two or more.

The bridge electrode may be formed on the insulating layer via an insulating layer on the sensing pattern, and the bridge electrode may be formed on the substrate, and the insulating layer and the sensing pattern may be formed thereon. The bridge electrode may be formed of the same material as the sensing pattern, and may be formed of molybdenum, silver, aluminum, copper, palladium, gold, platinum, zinc, tin, titanium or an alloy of two or more thereof.

Since the first pattern and the second pattern need to be electrically isolated, an insulating layer is formed between the sensing pattern and the bridge electrode. The insulating layer can be formed only between the joint of the first pattern and the bridge electrode, or can be formed as a layer covering the entire sensing pattern. In the case of a layer covering the entire sensing pattern, the bridge electrode can connect the second pattern via a contact hole formed on the insulating layer.

The touch sensor can further include an optical control layer which is disposed between the substrate and the electrode as means for appropriately compensating for a difference in transmittance between the pattern area in which the sensing pattern is formed and the non-pattern area in which the sensing pattern is not formed, and specifically, a difference in transmittance due to the difference in refractive index in these areas. The optical control layer can include an inorganic insulating material or an organic insulating material. The optical control layer can be formed by coating a photocurable organic pattern and a photocurable composition containing a solvent on the substrate. The photocurable composition can further include inorganic particles. The refractive index of the optical control layer can be increased by the inorganic particles.

A photocurable organic binder can contain a copolymer of each monomer such as an acrylate-based monomer, a styrene-based monomer, and a carboxylic acid-based monomer, in the range which the effect of the present invention is not impaired. The photocurable organic binder may be, for example, a copolymer including mutually different repeating units such as an epoxy group-containing repeating unit, an acrylate repeating unit, and a carboxylic acid repeating unit.

Examples of the inorganic particles include zirconia particles, titania particles, and alumina particles and the like.

The photocurable composition may further include various additives such as a photopolymerization initiator, a polymerizable monomer, and a curing assistant.

[Adhesive Layer]

Each layer (window film, circular polarizing plate, and touch sensor) forming the laminate for the flexible image display device and the film members (linear polarizing plate, λ/4 retardation plate and the like) constituting each layer can be bonded by an adhesive. Examples of the adhesive include commonly used adhesives and the like such as an aqueous adhesive, an aqueous solvent volatilization type adhesive, an organic solvent type, a solvent-free adhesive, a solid adhesive, a solvent volatilization type adhesive, a moisture-curing type adhesive, a heat-curing type adhesive, an anaerobic curing type, an active energy ray curing type adhesive, a curing agent mixed type adhesive, a heat melting type adhesive, a pressure sensitive type adhesive (pressure sensitive adhesive), and a remoistening type adhesive, and preferably, the aqueous solvent volatilization type adhesive, the active energy ray curing type, and the adhesive can be used. A thickness of the adhesive layer can be appropriately controlled according to the required adhesive force and the like, and is preferably 0.01 to 500 μm and more preferably 0.1 to 300 μm. Although a plurality of adhesive layers exist in the laminate for the flexible image display device, the thickness and the type of each adhesive layer may be the same or different.

As the aqueous solvent volatilization type adhesive, polymers dispersed in water such as a polyvinyl alcohol-based polymer, water-soluble polymers such as starch, an ethylene-vinyl acetate-based emulsion, a styrene-butadiene-based emulsion can be used as a main polymer. In addition to the main polymer and water, a crosslinking agent, a silane-based compound, an ionic compound, a crosslinking catalyst, an antioxidant, a dye, a pigment, an inorganic filler, an organic solvent and the like may be blended. In the case of the bonding by the aqueous solvent volatilization type adhesive, the aqueous solvent volatilization type adhesive is injected between the adherend layers to stick the adherend layers and dried to be able to impart an adhesive property. In the case of using the aqueous solvent volatilization type adhesive, the thickness of the adhesive layer is preferably 0.01 to 10 µm and more preferably 0.1 to 1 µm. When the aqueous solvent volatilization type adhesive is used in a plurality of layers, the thickness and the type of each layer may be the same or different.

The active energy ray curing type adhesive can be formed by curing an active energy ray curing composition containing a reactive material which forms an adhesive layer by irradiating the active energy ray. The active energy ray curing composition can contain at least one polymer of a radically polymerizable compound and a cationically polymerizable compound similar to those contained in the hard coat composition. As the radically polymerizable compound, the same compound as the radically polymerizable compound in the hard coat composition can be used.

As the cationically polymerizable compound, the same compound as the cationically polymerizable compound in the hard coat composition can be used.

As the cationically polymerizable compound used for the active energy ray curing composition, an epoxy compound is particularly preferable. It is also preferred to include a monofunctional compound as a reactive diluent in order to lower the viscosity as the adhesive composition.

The active energy ray composition can contain a monofunctional compound to lower the viscosity. Examples of the monofunctional compound include an acrylate-based monomer having one (meth)acryloyl group in one molecule thereof or a compound having one epoxy group or oxetanyl group in one molecule thereof, for example, glycidyl (meth)acrylate and the like.

The active energy ray composition can further contain a polymerization initiator. Examples of the polymerization initiator include a radical polymerization initiator, a cationic polymerization initiator, a radical and cationic polymerization initiator, which can be appropriately selected and used. These polymerization initiators are decomposed by at least one of the active energy ray irradiation and the heating to generate radicals or cations, thereby progressing the radical polymerization and the cationic polymerization. In the description of the hard coat composition, an initiator capable of initiating at least any one of the radical polymerization or the cationic polymerization by the active energy ray irradiation can be used.

The active energy ray composition can further contain an ion scavenger, an antioxidant, a chain transfer agent, an adhesion imparting agent, a thermoplastic resin, a filler, a flow viscosity adjusting agent, a plasticizer, an antifoaming agent solvent, an additive, and a solvent. In the case of bonding two adherend layers by the active energy ray curing type adhesive, the active energy ray curing composition is applied to any one or both of the adherend layers and then stuck, and any one of the adhesive layer or both of the adherend layers are irradiated with the active energy ray to be cured and bonded. In the case of using the active energy ray curing type adhesive, the thickness of the adhesive layer is preferably 0.01 to 20 µm and more preferably 0.1 to 10 µm. When the active energy ray curing type adhesive is used in a plurality of adhesive layers, the thickness and the type of each layer may be the same or different.

As the pressure-sensitive adhesive, any classified into an acrylic-based pressure-sensitive adhesive, a urethane-based pressure-sensitive adhesive, a rubber-based pressure-sensitive adhesive, a silicone-based pressure-sensitive adhesive and the like can be used according to the main polymer. In addition to the main polymer to the pressure-sensitive adhesive, a crosslinking agent, a silane-based compound, an ionic compound, a crosslinking catalyst, an antioxidant, a tackifier, a plasticizer, a dye, a pigment, an inorganic filler and the like may be blended. Each component constituting the pressure-sensitive adhesive is dissolved and dispersed in a solvent to obtain a pressure-sensitive adhesive composition, and the pressure-sensitive adhesive composition is applied on the substrate and then dried to form a pressure-sensitive adhesive layer. The adhesive layer may be formed directly, or may be separately formed on a substrate and transferred. It is also preferred to use a release film to cover an adhesive surface prior to the bonding. In the case of using the active energy ray curing type adhesive, the thickness of the adhesive layer is preferably 0.1 to 500 µm and more preferably 1 to 300 µm. When the pressure-sensitive adhesive is used in a plurality of layers, the thickness and the type of each layer may be the same or different.

[Light Shielding Pattern]

The light shielding pattern may be applied as at least a part of a bezel or a housing of the flexible image display device. A wiring disposed on a side edge part of the flexible image display device is hidden by the light shielding pattern and is hardly recognized visually, such that the visibility of the image is improved. The light shielding pattern may be in the form of a single layer or multiple layers. The color of the light shielding pattern is not particularly limited, and may be various colors such as black, white and metal color. The light shielding pattern can be formed of a pigment for realizing a color and a polymer such as an acrylic-based resin, an ester-based resin, an epoxy-based resin, polyurethane, and silicone. These may be used alone or in combination of two or more. The light shielding pattern can be formed by various methods such as printing, lithography, and inkjet. A thickness of the light shielding pattern is preferably 1 to 100 µm and more preferably 2 to 50 µm. In addition, it is also preferable to provide a shape such as inclination in a thickness direction of the light shielding pattern.

EXAMPLES

Hereinafter, the present invention will be described in more detail with reference to Examples. Unless otherwise stated, "%" and "parts" in Examples mean % by mass and parts by mass. First, the evaluation method will be described.

<1. Production of Optical Film>
[1-1. Preparation of Resin]

Production Example 1: Preparation of Polyimide Resin 1

A reaction vessel equipped with a silica gel tube, a stirring apparatus, and a thermometer and an oil bath were prepared in a separable flask. 75.6 g of 4,4'-(hexafluoroisopropylidene)diphthalic anhydride (6FDA) and 54.5 g of 2,2'-bis(trifluoromethyl)-4,4'-diaminodiphenyl (TFMB) were added to a reaction container installed in an oil bath. While the contents in the reaction container were stirred at 400 rpm, 530 g of N,N-dimethylacetamide (DMAc) was further added to the reaction container, and was kept stirred until the contents in the reaction container became a uniform solution. Subsequently, the mixture was kept stirred for an additional 20 hours while adjusting a temperature in the container to be in a range of 20 to 30° C. using the oil bath and reacted to form a polyamic acid. After 30 minutes, a stirring speed was changed to 100 rpm. After stirring for 20 hours, the reaction system temperature was returned to room temperature (25° C.), and 650 g of DMAc was further added to the reaction container to adjust a polymer concentration to be 10% by mass based on the total mass of contents in the reaction container. Furthermore, 32.3 g of pyridine and 41.7 g of acetic anhydride were further added to the reaction container, and the contents in the reaction container were stirred at room temperature for 10 hours to be imidized. The polyimide varnish was taken out from the reaction container. The resulting polyimide varnish was dropped into methanol to perform reprecipitation. The precipitate was taken out by filtration, and the resulting precipitate was dried by heating to remove a solvent, so polyimide resin 1 was obtained as a solid content (powder). As a result of GPC measurement on the resulting polyimide resin 1, a weight average molecular weight thereof was 350,000. In addition, an imidization rate of the polyimide resin 1 was 98.8%.

Production Example 2: Preparation of Polyimide Resin 2

A polyimide resin 2 having a weight average molecular weight of 280,000 and an imidization ratio of 98.3% was prepared in the same manner as in Preparation Example 1, except that the reaction time was changed from 20 hours to 16 hours.

Production Example 3: Preparation of Polyamideimide Resin 1

A reaction container in which a stirring blade is attached to a 1 L of separable flask and an oil bath were prepared. 45 g (140.52 mmol) of TFMB and 768.55 g of DMAc were added to the reaction container installed in the oil bath. The contents in the reaction container were stirred at room temperature under a nitrogen gas atmosphere and TFMB was dissolved in DMAc. Next, 18.92 g (42.58 mmol) of 6FDA was further added to the reaction container, and the contents in the reaction container were kept stirred at room temperature for 3 hours. Thereafter, 4.19 g (14.19 mmol) of 4,4'-oxybis(benzoyl chloride) (OBBC) and then 17.29 g (85.16 mmol) of terephthaloyl chloride (TPC) were further added to the reaction container and were kept stirred at room temperature for 1 hour. Next, 4.63 g (49.68 mmol) of 4-methylpyridine and 13.04 g (127.75 mmol) of acetic anhydride were further added to the reaction container, and the contents in the reaction container were stirred at room temperature for 30 minutes. Thereafter, the temperature in the container was raised to 70° C. using the oil bath. The temperature in the container was maintained at 70° C., and the contents in the reaction container were further stirred for 3 hours to obtain a reaction solution.

The resulting reaction solution was cooled to room temperature and added to a large amount of methanol in a thread form. The deposited precipitate was taken out and immersed in methanol for 6 hours. Thereafter, the precipitate was washed with methanol. Next, the precipitate was dried under reduced pressure at 100° C. to obtain polyamideimide resin 1. The weight average molecular weight of the polyamideimide resin 1 was 400,000, and the imidization rate was 98.1%.

Production Example 4: Preparation of Polyamideimide Resin 2

A reaction container in which a stirring blade is attached to a 1 L of separable flask and an oil bath were prepared. 45 g (140.52 mmol) of TFMB and 768.55 g of DMAc were added to the reaction container installed in the oil bath. The contents in the reaction container were stirred at room temperature under a nitrogen gas atmosphere and TFMB was dissolved in DMAc. Next, 19.01 g (42.79 mmol) of 6FDA was further added to the reaction container, and the contents in the reaction container were stirred at room temperature for 3 hours. Thereafter, 4.21 g (14.26 mmol) of OBBC and then 17.30 g (85.59 mmol) of TPC were further added to the reaction container, and the contents in the reaction container were stirred at room temperature for 1 hour. Next, 4.63 g (49.68 mmol) of 4-methylpyridine and 13.04 g (127.75 mmol) of acetic anhydride were further added to the reaction container, and the contents in the reaction container were stirred at room temperature for 30 minutes. Thereafter, the temperature in the container was raised to 70° C. using the oil bath. The temperature in the container was maintained at 70° C. and further stirred for 3 hours to obtain a reaction solution.

The resulting reaction solution was cooled to room temperature and added to a large amount of methanol in a thread form, and the deposited precipitate was taken out and immersed in methanol for 6 hours. Thereafter, the precipitate was washed with methanol. Next, the precipitate was dried under reduced pressure at 100° C. to obtain polyamideimide resin 2. The weight average molecular weight of the resulting polyamideimide resin 2 was 365,000, and the imidization rate was 98.3%.

[1-2. Preparation of Silica Dispersant]

Preparation Example 5: Preparation of Dispersant 1

Methanol-dispersed organized silica (particle diameter of 25 nm) was substituted with γ-butyrolactone (GBL) to obtain GBL-dispersed organized silica (solid content of 30.5%). The dispersant was defined as a dispersant 1.

[1-3. Preparation of Composition for Forming Hard Coat Layer]

Preparation Example 6: Preparation of Composition 1 for Forming Hard Coat Layer

25% by mass of an isopropanol silica sol (manufactured by Nissan Chemical Corporation, "IPA-ST-L", particle diameter of 20 to 30 nm), 15% by mass of a 10-functional urethane acrylate oligomer (manufactured by Shin-A T&C, "UV1000"), 18.5% by mass of a trifunctional monomer (M340 MIRAMER), 1.2% by mass of a photoinitiator (manufactured by BASF SE, "Irgacure (registered trademark)-184"), 0.3% by mass of a leveling agent (manufactured by BYK Additives & Instruments, "BYK-3530"), and 40% by mass of methyl ethyl ketone (MEK) were mixed, thereby preparing a composition 1 for forming a hard coat layer.

Preparation Example 7: Preparation of Composition for Forming Hard Coat Layer

7% by mass of a 10-functional urethane acrylate oligomer (manufactured by Shin-A T&C, "UV1000"), 38.5% by mass of a bifunctional monomer (M200 MIRAMER), 1.2% by mass of a photoinitiator (manufactured by BASF SE, "Irgacure 184"), 0.3% by mass of a leveling agent (manufactured by BYK Additives & Instruments, "BYK-3530"), and 53% by mass of methyl ethyl ketone (MEK) were mixed, thereby preparing a composition 2 for forming a hard coat layer.

[1-4. Preparation of Varnish]

(Preparation Example 8: Varnishes (1) and (2))

Vanishes (1) and (2) were prepared by dissolving a polyimide-based resin in the solvent with the composition shown in Table 1.

In addition, in Table 1, the content (unit: % by mass) in the "solvent" column represents the ratio (unit: % by mass) of the mass of the specific solvent, based on the total mass of the entire solvent. The content (unit: % by mass) in the "polyimide-based resin" column represents the ratio (unit: % by mass) of the mass of the specific polyimide-based resin, based on the total mass of the entire polyimide-based resin. PI-1, PI-2, PAI-1, and PAI-2 in the "polyimide-based resin" column represent a polyimide resin 1, a polyimide resin 2, a polyamideimide resin 1, and a polyamideimide resin 2, respectively. The content (unit: %) in the "solid content ratio" column represents the ratio (unit: % by mass) of the total mass of the components except for the solvent, based on the mass of the varnish.

[1-5. Production of Optical Film]

Example 1: Production of Optical Film 1

A coating film was formed by cast forming the varnish (1) on a polyethylene telephthalate (PET) film (manufactured by TOYOBO CO., LTD., "A4100", thickness of 188 μm, thickness distribution of ±2 μm). A linear velocity was 0.4 m/min. By performing subsequently heating at 70° C. for 8 minutes, at 100° C. for 10 minutes, at 90° C. for 8 minutes, and at 80° C. for 8 minutes, the coating film was dried to peel off the coating film from the PET film. The solvent was removed from the resulting raw material film 1 (width 700 mm), using a tenter-type dryer (configuration of one to six chambers) and using a clip as a gripping tool to obtain a polyimide film 1 having a thickness of 79 μm. A temperature in the dryer was set to 200° C., a clip holding width was adjusted to 25 mm, a film conveyance speed was adjusted to 1.0 m/min, a ratio of a film width (distance between clips) of an inlet of the dryer and a film width of an outlet of a drying furnace was adjusted to 1.0, and a wind speed in each

TABLE 1

| | Solvent | | Polyimide-based resin | | | | Filler | Additive | | Solid content |
| --- | --- | --- | --- | --- | --- | --- | --- | --- | --- | --- |
| | DMAc [wt %] | GBL [wt %] | PI-1 [wt %] | PI-2 [wt %] | PAI-1 [wt %] | PAI-2 [wt %] | Dispersant 1 [wt %] | UVA [Phr] | BA [ppm] | ratio [%] |
| Varnish (1) | 10 | 90 | 50 | 50 | — | — | — | — | — | 16.5 |
| Varnish (2) | — | 100 | — | — | 50 | 50 | — | — | — | 8.2 |
| Varnish (3) | — | 100 | — | — | 50 | 50 | 100 | 5.7 | 35 | 10.3 |

Preparation Example 9: Preparation of Varnish (3)

Varnish (3) was prepared with the composition shown in Table 1. Specifically, a polymer and a filler (contained in the dispersant 1) were mixed in the GBL solvent at room temperature so that a composition ratio (mass ratio) of the polymer and the filler was 60:40, Sumisorb 340 (UVA) manufactured by Sumika Chemtex Co., Ltd. as an ultraviolet absorbent and Sumiplast (registered trademark) Violet B(BA) manufactured by Sumika Chemtex Co., Ltd. as a brightener were further added to the mixture so as to be 5.7 phr and 35 ppm, with respect to the total mass of the polymer and the silica, respectively, and the mixture was stirred until it became uniform, thereby obtaining the varnish (3).

Note that, in Table 1, the content (unit: wt %) of the "filler" column represents the ratio (unit: % by mass) of the mass of the filler, based on the total mass of the entire filler dispersant. The content (unit: Phr) of "additive UVA" column represents the ratio (unit: % by mass) of the mass of the UVA, based on the total mass of the solid content (silica) of the polyimide-based resin and the dispersant 1. The content (unit: ppm) of "additive BA" column represents the ratio (unit: ppm) of the mass of the BA, based on the total mass of the solid content (silica) of the polyimide-based resin and the dispersant 1.

chamber of the tenter-type dryer was adjusted to 13.5 m/sec in one chamber, 13 m/sec in two chambers, 11 m/sec in three to six chambers. After the film was released from the clip, the clip portion was slit, and the PET-based protective film was bonded to the film and wound on a 6-inch core formed of ABS to obtain a roll film.

Example 2: Production of Optical Film 2

The composition 1 for forming a hard coat layer prepared in Preparation Example 6 was cured on the surface of the substrate, with which the PET film was in contact, at the time of forming the optical film 1 obtained in Example 1, and then applied so that the hard coat layer had a thickness of 20 μm, and drying was performed in an oven of 80° C. for 1 hour. Thereafter, the coating film was irradiated with light having a light intensity of 350 mJ/cm$^2$ using a high pressure mercury lamp and cured to form a first hard coat layer. On the other surface, the composition 2 for forming a hard coat layer prepared in Preparation Example 7 was applied so that the hard coat layer had a thickness of 15 μm after curing, and drying was performed in an oven of 80° C. for 2 hours. Thereafter, the coating film was irradiated with light having a light intensity of 350 mJ/cm$^2$ using a high pressure mercury lamp and cured to form an optical film 2 including a hard coat layer.

Example 3: Production of Optical Film 3

An optical film 3 having a thickness of 49 μm was produced in the same manner as in the production method of the optical film 1, except that the varnish (1) was changed to the varnish (2), the linear velocity was changed from 0.4 m/min to 0.3 m/min, and the heating conditions of the coating film were subsequently changed from at 70° C. for 8 minutes, at 100° C. for 10 minutes, at 90° C. for 8 minutes, and at 80° C. for 8 minutes to at 80° C. for 10 minutes, at 100° C. for 10 minutes, at 90° C. for 10 minutes, and at 80° C. for 10 minutes.

Example 4: Production of Optical Film 4

An optical film 4 having a thickness of 79 μm was produced in the same manner as in the production method of the optical film 1, except that the varnish (1) was changed to the varnish (3), and the linear velocity was changed from 0.4 m/min to 0.2 m/min.

Example 5: Production of Optical Film 5

An optical film 5 having a thickness of 30 μm was produced in the same manner as in the production of the optical film 4, except that the heating conditions were changed from at 70° C. for 8 minutes, at 100° C. for 10 minutes, at 90° C. for 8 minutes, and at 80° C. for 8 minutes to at 70° C. for 8 minutes, at 90° C. for 10 minutes, at 85° C. for 8 minutes, and at 80° C. for 8 minutes.

Comparative Example 1: Preparation of Optical Film 6

A polyimide film (manufactured by UBE INDUSTRIES, LTD., "UPILEX", thickness of 50 μm) was prepared for an optical film 6.

The formulation of the composition and the composition of the optical film are summarized in Table 2. Note that "present or absent of HC" column shows whether the hard coat layer is included (present) or not (absent) in FIG. 2.

TABLE 2

|  | Varnish | Polyimide-based resin | Filler | Film thickness [μm] | Presence or absence of HC |
|---|---|---|---|---|---|
| Example 1 | Varnish (1) | PI-1 + PI-2 | — | 79 | Absence |
| Example 2 | Varnish (1) | PI-1 + PI-2 | — | 114 | Presence |
| Example 3 | Varnish (2) | PAI-1 + PAI-2 | — | 49 | Absence |
| Example 4 | Varnish (3) | PAI-1 + PAI-2 | Silica | 79 | Absence |
| Example 5 | Varnish (3) | PAI-1 + PAI-2 | Silica | 30 | Absence |
| Comparative Example 1 | — | PI | — | 50 | Absence |

<2. Measurement Method>

When the optical films obtained in Examples and Comparative Examples have the protective film, the following measurement and evaluation were performed using the optical film in the state where the protective film was peeled off.

(2-1. Measurement of Transmission Image Clarity Value of Optical Film)

The transmission image clarity value of the optical film was measured by the following transmission method using an image clarity meter (manufactured by Suga Test Instruments Co., Ltd., "ICM-1") in accordance with JIS K 7345.

The optical film was provided in the image clarity measuring device. The optical film whose both surfaces are lightly wiped with ethanol prior to installation was dried and installed in a state in which foreign matters are removed from the surface thereof. Next, the light amount and the cross-sectional area were adjusted, and the white light adjusted to parallel light was irradiated to the installed optical film from an angle (incident angle) inclined 60° in the MD direction with respect to the plane of the optical film. A cross-sectional area of the transmitted light transmitted through the optical film was adjusted and transmitted to the optical comb extending vertically to the optical axis of the irradiation light, and the light transmitted through the optical comb was received by the light receiver.

The light receiver repeatedly received the transmitted light of the optical comb (slit width: 0.125 mm) by moving the optical comb in a predetermined unit width in a direction which was parallel to a plane of the optical comb and in which slits were arranged in the optical comb. As a result, the received light waveform was obtained. The maximum value M and the minimum value m of the relative light amount were obtained from the received light waveform obtained. The first transmission image clarity value $C_0(MD)$ is calculated based on Formula (5) from the M and m obtained.

The second transmission image clarity value $C_0(TD)$ and the third transmission image clarity value $C_0$ were measured in the same manner as in the first transmission image clarity value, except that the incident angle was changed from the angle inclined 60° in the TD direction from the vertical direction to the plane of the optical film to the angle (angle inclined 0°) vertical to the plane of the optical film.

(2-2. Total Light Transmittance and Haze of Optical Film)

The total light transmittance of the optical film is based on JIS K 7361-1:1997, and the haze is based on JIS K 7136: 2000, and the total light transmittance and the haze were measured using a fully automatic direct reading haze computer HGM-2DP manufactured by Suga Test Instruments Co., Ltd. The measurement samples were produced by cutting the optical films of Examples and Comparative example into a size of 30 mm×30 mm.

(2-3. Yellow Index of Optical Film)

The yellow index (YI value) of the optical film was measured by an ultraviolet-visible near infrared spectrophotometer V-670 manufactured by JASCO Corporation. After the background measurement was performed in the state where the sample is absent, the optical film was set on the sample holder and the transmittance of light of 300 to 800 nm was measured to determine three stimulus values (X, Y, Z). The YI value was calculated based on the following Equation. Note that when the protective film is laminated on the side opposite to the support of the optical film, the protective film was peeled off and the yellow index was measured.

$$\text{YI value} = 100 \times (1.2769X - 1.0592Z)/Y$$

(2-4. Tensile Modulus of Optical Film)

The tensile modulus of the optical film was measured by performing the tensile test at a test speed of 5 m/min and a load cell of 5 kN, using an electromechanical universal tester (manufactured by Instron Corporation), in accordance with JIS K 7127.

(2-5. Thickness of Optical Film)

The thickness of the optical film at 10 points or more was measured using a micrometer ("ID-C112XBS" manufactured by Mitutoyo Corporation), and the average value was calculated.

(2-6. Molecular Weight (Weight Average Molecular Weight) of Polyimide-Based Resin)

The gel permeation chromatography (GPC) measurement was performed using a liquid chromatograph LC-10ATvp manufactured by Shimadzu Corporation.

(1) Pretreatment Method

The sample was dissolved in γ-butyrolactone (GBL) to make 20% by mass of solution, diluted 100 times with DMF eluent, and filtered through 0.45 μm of membrane filter to obtain a measurement solution.

(2) Measurement Condition

Column: TSKgel Super AWM-H×2+Super AW 2500×1 (6.0 mm ID×150 mm×3)

Eluent: DMF (with 10 mmol of lithium bromide added)

Flow rate: 0.6 mL/min

Detector: RI detector

Column temperature: 40° C.

Injection amount: 20 μL

Molecular weight standard: Standard polystyrene (2-7. Particle Diameter of Silica Particle)

The particle diameter of the silica particle was calculated from the specific surface area measured value by a BET adsorption method in accordance with JIS Z 8830. The specific surface area of powder obtained by drying a silica sol at 300° C. was measured using a specific surface area measuring device (manufactured by Yuasa Ionics Inc., "Monosorb (registered trademark) MS-16").

(2-8. Imidization Ratio)

The imidization rate was determined by $^1$H-NMR measurement as follows.

(1) Pretreatment Method

The optical film containing the polyimide-based resin was dissolved in deuterated dimethyl sulfoxide (DMSO-$d_6$), and 2% by mass of solution was used as a measurement sample.

(2) Measurement Condition

Measurement device: 400 MHz NMR device JNM-ECZ400S/L1 manufactured by JEOL

Standard substance: DMSO-$d_6$ (2.5 ppm)

Sample temperature: Room temperature

The number of times of integration: 256 times

Relaxation time: 5 seconds (3) Imidization Rate Analysis Method (Imidization Rate of Polyimide Resin)

In the $^1$H-NMR spectrum obtained from the measurement sample containing the polyimide resin, among the observed benzene protons, the integral value of benzene proton A derived from the structure which was not changed before and after imidization was defined as $Int_A$. Also, the integral value of the amide proton derived from the amic acid structure remaining in the observed polyimide resin was defined as $Int_B$. The imidization rate of the polyimide resin was determined based on the following Equation from these integral values.

$$\text{Imidization rate (\%)} = 100 \times (1 - Int_B/Int_A)$$

(Imidization Rate of Polyamideimide Resin)

In the $^1$H-NMR spectrum obtained from the measurement sample containing the polyamideimide resin, among the observed benzene protons, the integral value of benzene proton C which is not affected by a structure derived from the structure which was not changed before and after imidization and a structure derived from the amic acid structure remaining in the polyamideimide resin was defined as $Int_C$. In addition, among the observed benzene protons, an integral value of benzene proton D which is affected by a structure derived from the structure which was not changed before and after imidization and the structure derived from the amic acid structure remaining in the polyamideimide resin was defined as $Int_D$. A β value was obtained from the determined $Int_C$ and $Int_D$ according to the following Equation.

$$\beta = Int_D/Int_C$$

Next, the β value of the above Equation for the plurality of polyamideimide resin and the imidization rate of the polyimide resin of the above Equation were obtained, and the following Correlation Equation was determined from these results.

$$\text{Imidization rate (\%)} = k \times \beta + 100$$

In the above Correlation Equation, k is a constant.

Substituting β into the Correlation Equation, the imidization rate (%) of the polyamideimide resin was obtained.

(2-9. Bending Test)

The optical film was subjected to a bending test in accordance with JIS K 5600-5-1. A bending test was performed using a desk bending tester (manufactured by YUASA SYSTEM Co., Ltd.). For the optical film after the bending test, the transmission image clarity value and the haze were measured, in the same manner as in the measurement method described above. Each of the transmission image clarity value and the haze after the bending test was obtained, and each of a $\Delta C_{60}(MD)$, a difference in the transmission image clarity values (a difference in the first transmission image clarity values, a $\Delta C_{60}(TD)$, a difference in the second transmission image clarity values, and a $\Delta C_0$, a difference in the third transmission image clarity values) and a ΔHaze in the hazes was calculated.

(2-10. Bending Test (MIT))

In accordance with ASTM standard D 2176-16, the number of times of bending of the optical film in Examples and Comparative Examples was determined as follows. The optical film was cut into strip forms of 15 mm×100 mm using a dumbbell cutter to prepare a measurement sample. The measurement sample was set in a main body of an MIT folding endurance fatigue tester ("Type 0530" manufactured by Toyo Seiki Seisaku-sho, Ltd.). Specifically, one end of the measurement sample was fixed to a load clamp, the other end was fixed to a bending clamp, and tension was applied to the measurement sample. In this state, under a test speed of 175 cpm, a bending angle 135°, a load of 0.75 kgf, and a bending radius of the bending clamp of R=1, a reciprocating bending motion was performed in a back and front direction until the measurement sample was broken. The number of times of bending was measured.

<3. Evaluation Method>
(3-1. Visibility)

The optical film was cut into a 10 cm square. The MD direction of the polarizing plate with an adhesive layer and the same size (square of 10 cm) and the MD direction of the cut optical film were aligned, and the polarizing plate with the adhesive layer was stuck to the cut optical film to produce a sample for evaluation. Two samples for evaluation were produced for each of the optical films of one Example and Comparative Example.

One of two samples for evaluation was fixed on a base so that a fluorescent lamp is positioned vertically to a plane of the sample for evaluation, and a longitudinal direction of the fluorescent lamp is horizontal to the MD direction of the sample for evaluation.

An observer visually observed the fluorescent lamp image on the surface of the sample for evaluation at an angle of 30° with respect to the vertical direction of the plane of the sample for evaluation.

Similarly, the other sample for evaluation was fixed on the base and the fluorescent lamp image was observed, except that the longitudinal direction of the fluorescent lamp was changed from horizontal to vertical.

From the observation results, the visibility was evaluated based on the following evaluation criteria.

(Evaluation Criteria for Visibility)

⊙: Distortion of the fluorescent lamp image is hardly visualized.

○: Some distortion of the fluorescent lamp image can be visually recognized.

Δ: Distortion of the fluorescent lamp image is visualized.

x: Distortion of the fluorescent lamp image is clearly visualized.

<4. Evaluation Result>

A total light transmittance, a haze, a transmission image clarity value, and a yellow index, and the number of times of bending were measured in Examples 1 to 5 and Comparative Example 1 to evaluate visibility. The measurement and evaluation results are summarized in Tables 3 to 5. Note that the column "Tt (%)" in Table 3 indicates the total light transmittance (unit: %) of the optical film. The column "Haze (%)" in Table 3 indicates the haze (unit: %) of the optical film.

TABLE 3

| | Optical characteristics | | Transmission image clarity value | | | | | Modulus [MPa] | Yellow index YI value | Folding endurance test (MIT) The number of times of folding [times] |
|---|---|---|---|---|---|---|---|---|---|---|
| | Tt [%] | Haze [%] | $C_0$ [%] | $C_{60}$ (MD) [%] | $C_{60}$ (TD) [%] | $C_{60}(MD)/C_0$ [Dimensionless] | $C_{60}(TD)/C_0$ [Dimensionless] | | | |
| Example 1 | 91.5 | 0.2 | 98.6 | 92.2 | 92.4 | 0.935 | 0.939 | 4,000 | 1.1 | 360,000 |
| Example 2 | 91.3 | 0.2 | 97.8 | 91.0 | 90.2 | 0.930 | 0.921 | 4,200 | 1.4 | 200,000 |
| Example 3 | 89.5 | 0.2 | 98.4 | 92.1 | 93.0 | 0.936 | 0.945 | 7,500 | 1.8 | 730,000 |
| Example 4 | 90.0 | 0.3 | 98.0 | 89.1 | 89.3 | 0.909 | 0.911 | 5,000 | 1.7 | 20,000 |
| Example 5 | 92.0 | 0.2 | 99.0 | 93.7 | 93.3 | 0.946 | 0.942 | 5,200 | 1.7 | 100000 |
| Comparative Example 1 | 26.1 | 3.4 | 95.1 | 90.7 | 83.8 | 0.953 | 0.881 | 9,600 | 120.6 | >800,000 |

TABLE 4

| | Transmission image clarity value [%] | | | | Difference in transmission image clarity values [%] | | | Haze |
|---|---|---|---|---|---|---|---|---|
| | Before bending | | After bending | | $\Delta C_{60}$ | $\Delta C_{60}$ | | $\Delta$Haze |
| | $C_{60}$ (MD) | $C_{60}$ (TD) | $C_{60}$ (MD) | $C_{60}$ (TD) | (MD) | (TD) | $\Delta C_0$ | [%] |
| Example 1 | 92.2 | 92.4 | 91.9 | 90.4 | 0.9 | 2.0 | 0.5 | 0.1 |
| Example 2 | 91.0 | 90.2 | 90.0 | 88.0 | 1.0 | 2.2 | 0.6 | 0.2 |
| Example 3 | 92.1 | 93.0 | 90.7 | 90.3 | 0.3 | 2.7 | 0.5 | 0.1 |
| Example 4 | 89.1 | 89.3 | 85.5 | 84.7 | 3.6 | 4.7 | 0.5 | 0.2 |
| Example 5 | 93.7 | 93.3 | 92.5 | 92.1 | 1.2 | 1.2 | 0.5 | 0.1 |
| Comparative Example 1 | 90.7 | 83.8 | 85.2 | 74.3 | 5.5 | 9.5 | 1.0 | 0.5 |

TABLE 5

| | Visibility | |
| --- | --- | --- |
| | Vertical direction | Horizontal direction |
| Example 1 | ⊙ | ○ |
| Example 2 | ○ | ○ |
| Example 3 | ⊙ | ○ |
| Example 4 | Δ | Δ |
| Example 5 | ○ | ○ |
| Comparative Example 1 | × | × |

In all the optical films 1 to 5 of Examples 1 to 5 including a polyimide-based resin, the total light transmittance was 85% or more and the haze was 0.5% or less. In addition, in the optical films 1 to 5, both the first transmission image clarity value and the second transmission image clarity value were 87% or more and 100% or less, and a ratio $C_{60}(MD)/C_0$ was 0.8 or more and 1.0 or less. That is, the optical films 1 to 5 satisfied Formulae (1) to (3).

Further, in the optical films 1 to 5, the evaluation result of visibility was either ⊙, ○, or Δ.

In the optical film 6 of Comparative Example 1, the total light transmittance was less than 85%, the haze was more than 0.5%, and the second transmission image clarity value was less than 87%.

Further, in the optical film 6, the evaluation result of visibility was ×.

It is apparent that, in the optical films of Examples 1 to 5, the visibility in a wide angle direction is excellent and an angle dependency of the visibility is small, as compared to the optical film of Comparative Example 1.

In addition, it was confirmed that the optical films of Examples 1 to 5 have a low yellow index and excellent folding resistance.

What is claimed is:

1. An optical film comprising at least one resin selected from the group consisting of a polyimide-based resin and a polyamide-based resin and having a total light transmittance of 85% or more and a haze of 0.5% or less,
wherein
when a direction parallel to a machine direction in a plane of the optical film during production of the optical film is defined as an MD direction and a direction vertical to the machine direction is defined as a TD direction,
a first transmission image clarity value $C_{60}(MD)$ in a direction inclined 60° in the MD direction from a vertical direction to the plane of the optical film, a second transmission image clarity value $C_{60}(TD)$ in a direction inclined 60° in the TD direction from the vertical direction, and a third transmission image clarity value $C_0$ of the vertical direction which are obtained when a width of an optical comb is 0.125 mm in accordance with JIS K 7374 satisfy Formula (1):

$$87\% \leq C_{60}(MD) \leq 100\% \quad (1),$$

Formula (2):

$$87\% \leq C_{60}(TD) \leq 100\% \quad (2), \text{ and}$$

Formula (3):

$$0.8 \leq C_{60}(MD)/C_0 \leq 1.0 \quad (3).$$

2. The optical film according to claim 1, wherein the second transmission image clarity value and the third transmission image clarity value further satisfy Formula (4):

$$0.9 \leq C_{60}(TD)/C_0 \leq 1.0 \quad (4).$$

3. The optical film according to claim 1, wherein a ΔHaze, a difference in the hazes before and after a bending test in accordance with JIS K 5600-5-1, is less than 0.3%.

4. The optical film according to claim 1, wherein each of a $\Delta C_{60}(MD)$, a difference in the first transmission image clarity values before and after a bending test in accordance with JIS K 5600-5-1, a $\Delta C_{60}(TD)$, a difference in the second transmission image clarity values before and after the bending test, and a $\Delta C_0$, a difference in the third transmission image clarity values before and after the bending test, is less than 15.

5. The optical film according to claim 1, wherein the optical film has a thickness of 10 to 150 μm.

6. The optical film according to claim 1, wherein a tensile modulus at 80° C. is 4,000 to 9,000 MPa.

7. The optical film according to claim 1, wherein the optical film has a hard coat layer on at least one surface thereof.

8. The optical film according to claim 7, wherein the hard coat layer has a thickness of 3 to 30 μm.

9. A flexible display device comprising the optical film according to claim 1.

10. The flexible display device according to claim 9, further comprising a touch sensor.

11. The flexible display device according to claim 9, further comprising a polarizing plate.

* * * * *